United States Patent
Sur et al.

(10) Patent No.: US 11,150,967 B2
(45) Date of Patent: Oct. 19, 2021

(54) OVERLAPPED RENDEZVOUS MEMORY REGISTRATION

(71) Applicant: Intel Corporation, Santa Clara, CA (US)

(72) Inventors: Sayantan Sur, Portland, OR (US); Keith Underwood, Powell, TN (US); Ravindra Babu Ganapathi, Hillsboro, OR (US); Andrew Friedley, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 668 days.

(21) Appl. No.: 15/721,854

(22) Filed: Sep. 30, 2017

(65) Prior Publication Data
US 2019/0102236 A1 Apr. 4, 2019

(51) Int. Cl.
*G06F 9/54* (2006.01)
*G06F 9/30* (2018.01)

(52) U.S. Cl.
CPC ............ *G06F 9/544* (2013.01); *G06F 9/3004* (2013.01); *G06F 9/546* (2013.01)

(58) Field of Classification Search
None
See application file for complete search history.

(56) References Cited

U.S. PATENT DOCUMENTS

| 2010/0232448 A1* | 9/2010 | Sugumar |
| 2012/0243542 A1* | 9/2012 | Sugumar |
| 2015/0067067 A1* | 3/2015 | Archer |

* cited by examiner

*Primary Examiner* — Syed A Roni
(74) *Attorney, Agent, or Firm* — Compass IP Law PC

(57) ABSTRACT

Methods, software, and systems for improved data transfer operations using overlapped rendezvous memory registration. Techniques are disclosed for transferring data between a first process operating as a sender and a second process operating as a receiver. The sender sends a PUT request message to the receiver including payload data stored in a send buffer and first and second match indicia. The first match indicia is used to determine whether the PUT request is expected or unexpected. If the PUT request is unexpected, an RMA GET operation is performed using the second matching indicia to pull data from the send buffer and write the data to a memory region in the user space of the process associated with the receiver. If the PUT request message is expected, the data payload with the PUT request is written to a receive buffer on the receiver determined using the first match indicia.

25 Claims, 15 Drawing Sheets

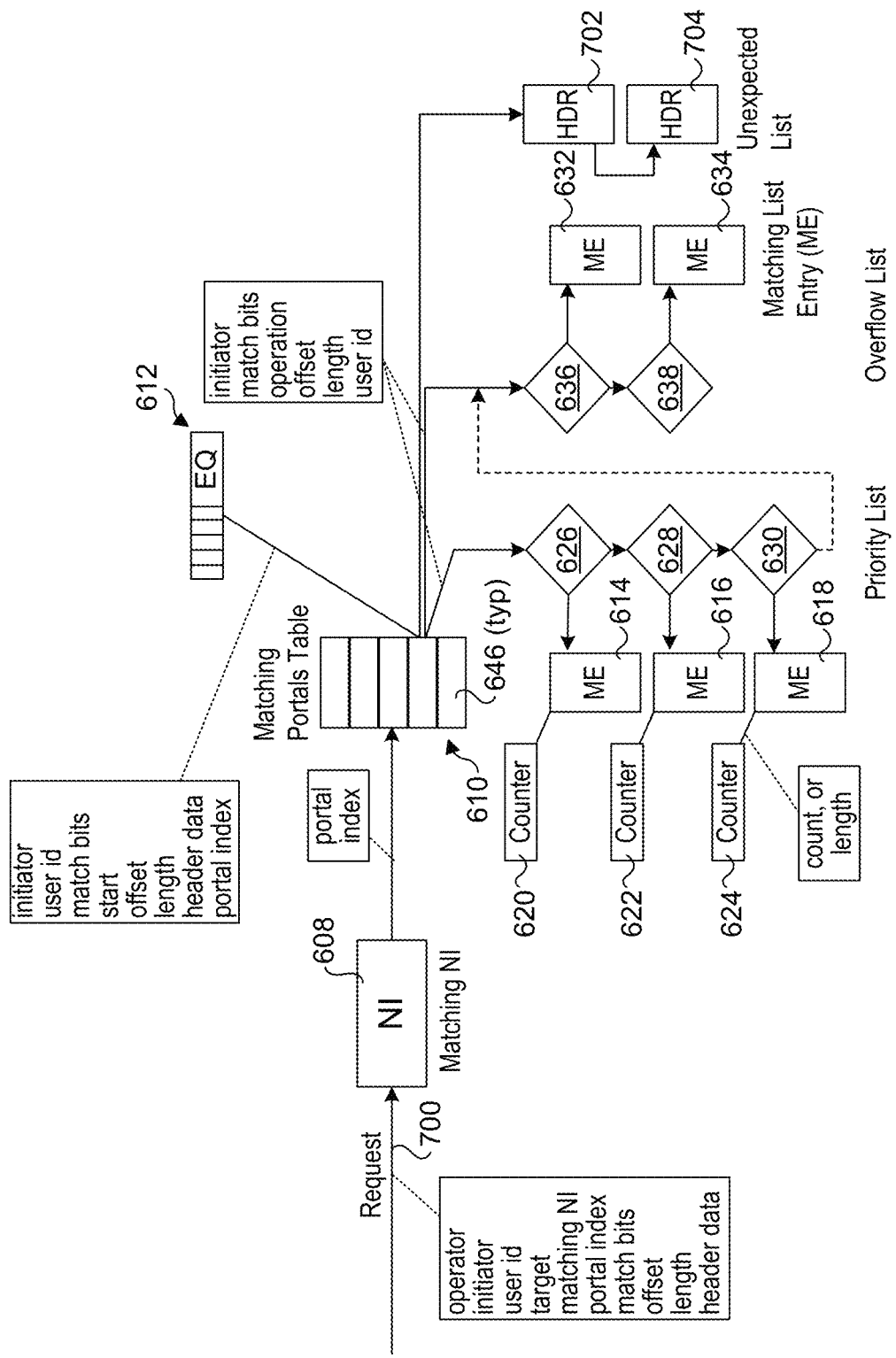
Fig. 7 *(Prior Art)*

OVERLAPPED RENDEZVOUS MEMORY REGISTRATION

BACKGROUND INFORMATION

High Performance Computing (HPC) has seen tremendous growth and interest in recent years. With the increased availability of processing resources, such as available through Infrastructure as a Service (IaaS) and Platform as a Service (PaaS) offerings provided by the likes of Amazon, Google, and Microsoft, individuals and companies that previously had no access to sufficient computing resources for performing complex tasks can now access those resources at very low cost. In addition, HPC is widely used within companies and at research universities for a large diversity of tasks, including machine learning, data mining, and complex modeling, among other tasks.

Under HPC, a computing task or set of related tasks is processed by distributing the workload across many compute nodes, with the number of nodes ranging from a few to into the millions. This is also referred to as parallel computing. Historically, HPC was performed on a so-called "supercomputer," which typically was a monolithic system employed thousands of processors configured in arrays. Today, the term supercomputer not only encompasses the foregoing monolithic systems, but also refers to systems having 1000's to millions of compute elements interconnected across high-speed networks.

In order to implement parallel computing, there needs to be a mechanism and associated communication model for communicating the code to be used for processing and associated data between the compute nodes. The de-facto communication model for HPC is the Message Passing Interface (MPI). MPI defines the syntax and semantics of a core of library routines useful to a wide range of users writing portable message-passing programs in Fortran or C. MPI can be run in environments, including tightly coupled, massively parallel machines (MPPs) and on networks of workstations (NOWs). In addition to standardized core library routines, MPI routines may be extended to support custom functionality.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 7 is a diagram illustrating Portals matching address structures;

DETAILED DESCRIPTION

Figure 1:
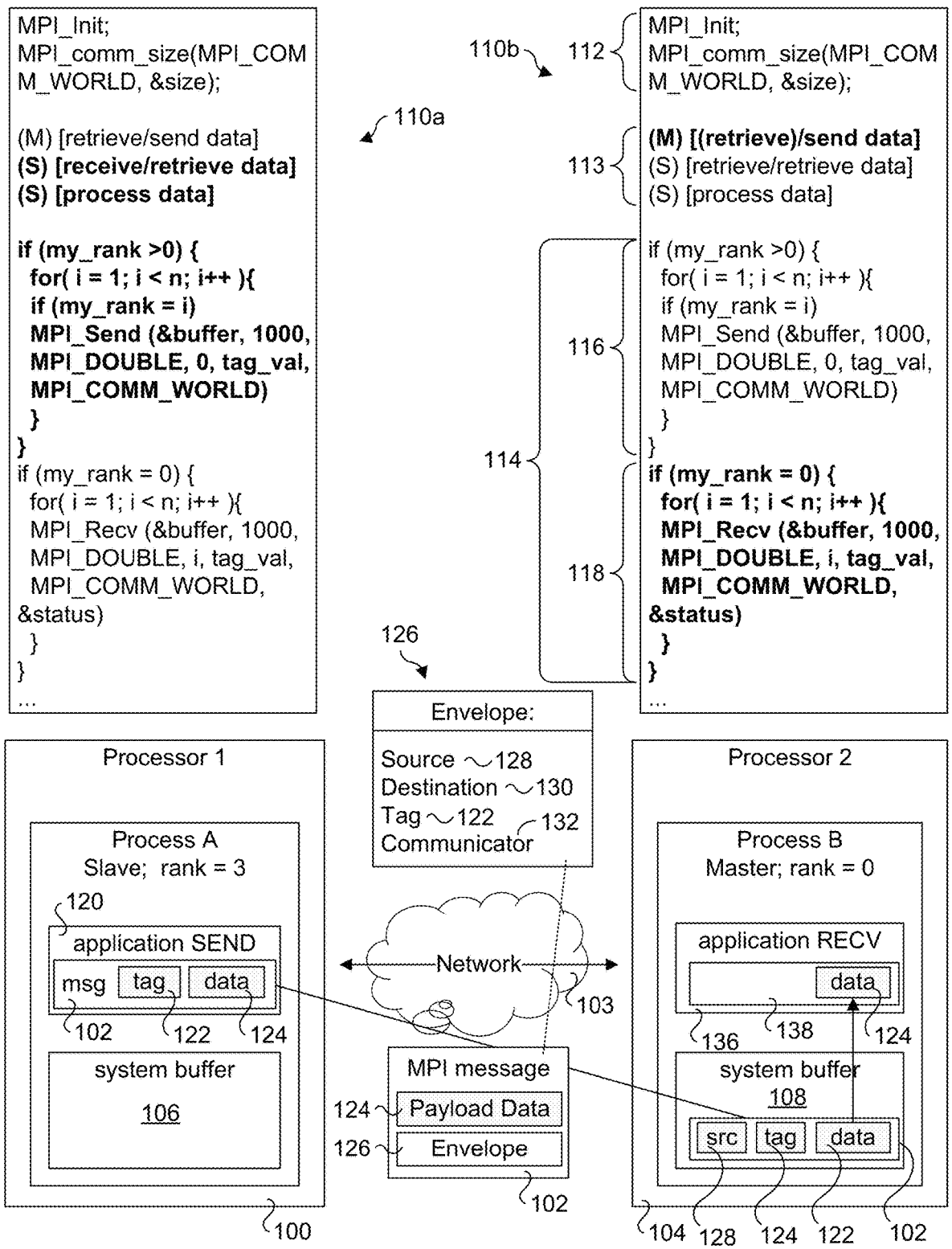
FIG. 1 is a diagram illustrating a data transfer between first and second Processes executing a portion of an MPI application, wherein Process A performs an MPI_Send function to asynchronously send data to Process B, which performs an MPI_Recv function.

Embodiments of methods, software, and systems for improved data transfer operations using overlapped rendezvous memory registration are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

MPI defines various types of messages that are sent between processes running on machines (both physical and virtual) using networked (over both physical and virtual networks) communication. Generally, the term "network" as used herein covers various types of communication facilities and mechanisms, including both physical and virtual networks, as well as physical "fabrics" supporting a variety of protocols, including both public and private protocols. Moreover, the network or fabric may enable communication between processes running on separate physical machines and/or processing running on virtual machines or even via multiple threads running on the same machine (physical or virtual)

MPI is used to support parallel programming via execution of MPI code on multiple peer nodes. Generally, Fortran or C code is written defining (with the same MPI program) code to be executed as MPI processes on the multiple peer MPI nodes. Under a common approach, the same code is distributed across all of the MPI nodes that are to work on the same task or portion of a task in parallel, with one of the peers being designated as a "master" or "master node," while the other peers are designated as "slaves" or "slave nodes." During an MPI initialization operation, information is passed between the peer processes, identifying each MPI process with a unique numerical identity, referred to as a process identifier (ID) or "rank," with the master node (typically) being allocated a rank of '0,' and the slave nodes being allocated a rank corresponding to a number ranging from '1' to 'n−1', where n equal the total number of MPI nodes. During execution of the code, each node executes the applicable code blocks for that node, as identifying by its rank. This code may include various MPI messages that are used to pass data between the different MPI processes.

As its named implies, the fundamental aspect of MPI is message passing. In basic message passing, the processes operating at the sender and receiver coordinate their activities by explicitly sending and receiving messages. The most basic messages communication operations are MPI_Send and MPI_Recv. The following shows the structure of the MPI_Send function:

| int MPI_Send(void* | buffer |
|---|---|
| int | count |
| MPI_Datatype | datatype |
| int | destination |
| int | tag |
| MPI_Comm | communicator) |

The following shows the structure of the MPI_Recv function:

| int MPI_Recv(void* | buffer |
|---|---|
| int | count |
| MPI_Datatype | datatype |
| int | source |
| int | tag |
| MPI_Comm | communicator |
| MPI_Status* | status) |

To facilitate communication between processes, communication endpoints (MPI nodes) execute code containing MPI function calls (along with other code used for data processing and other purposes). As discussed above, under a common approach, all nodes run the same code, wherein the portions of the code executed by each node is based on the node's rank (e.g., rank=0 for master and rank=1 to n−1 for slaves). At a given section of code, there is an MPI function call for each slave node to send data, such as an MPI_Send function call. When that same section of code is executed by the master node (rank=0), the MPI_Recv function is called multiple times such that there is an MPI_Recv function call that is paired with each corresponding MPI_Send function call.

Pairing of MPI send and receive operations is often done using loops, wherein the code loops from rank=1 to rank=n−1. On the slave side the code in the loop is set up so that when the loop count value=my_rank, where my_rank is the rank for a given slave, the slave calls an MPI_Send function contained in the loop. Thus, for the code section each slave only executes a single MPI_Send function. Meanwhile, for each iteration through the loop the master performs an MPI_Recv function using source (which is a slave)=current loop count value. This results in the master performing (n−1) MPI_Recv function calls. This also pairs instances of MPI_Send and MPI_Recv operations on the senders and receivers.

An example of operations performed at a sender and receiver when passing an MPI message is shown in FIG. 1. A Process A is running on a first processor 100 (also labeled and referred to as Processor 1) and is a sender that transmits an MPI message 102 over a network 103 to a second Process B running on a second processor 104 (also labeled as Processor 2) and operating as a receiver. As further shown, Processor A corresponds to a Slave node with a rank=3, while Process B is a Master node with rank=0. Process A has allocated a system buffer 106, while Process B has allocated a system buffer 108.

Each of Process A and B execute a copy of the same application code 110, depicted as application code 110a and application code 110b. Application code 110 is depicted as including an initialization section 112, a data receive/retrieve and processing section 113, followed by a code section 114 including a slave code block 116 and a master code block 118. Process A executes application code 110a, while Process B executes application code 110b. Execution of the application code in the separate Processes A and B is generally asynchronous (for individual instructions), with built-in synchronizing mechanisms provided by the MPI implementation, as described below.

Generally, the MPI code executed by MPI processes is configured to be executed such that the message send and receive operations on the MPI peers (e.g., slaves and the master in this example) are coordinated. While MPI supports explicit synchronization instructions (e.g., MPI_Wait, MPI_Waitany, etc.), properly configured code can achieve the same result without using these explicit synchronization instructions. MPI_Send and MPI_Recv are referred to as "blocking" messages; MPI also supports similar "non-blocking" messages, such as MPI_Isend and MPI_Irecv. From a functional standpoint, an MPI_Send is equivalent to MPI_Isend( ); MPI_Wait( ). Similarly, MPI_Recv is equivalent to MPI_Irecv( ); MPI_Wait( ). The non-blocking forms allow for multiple transfers to be overlapped, possibly with computation, and are also sometimes needed to avoid deadlock scenarios. For simplicity, the use of the blocking form of MPI messages is illustrated in FIG. 1.

As Process A executes application code 110a, it first executes initialization section 112, which begins with an MPI_Init instruction, which perform an MPI Initialization. This is followed by an MPI_comm_size(MPI_COMM_WORLD, &size) instruction, which specifies the MPI Communicator is MPI_COMM_WORLD and includes a reference to a data structure identifying the MPI nodes participating in the (parallel) application. There is also some additional initialization code including code that is used to identify the rank of each MPI node that is not shown. As discussed above, Processor A is a Slave node with rank=3, while Process B is a Master node with rank=0.

After the MPI initialization operation, application code 110 includes a data retrieving/receiving and processing section 113. For ease of explanation, this code section is shown in simplified form, with (M) denoting operations that may be performed by the Master, and (S) denoting operations performed by the slaves. Depending on the particular task to be performed, a Slave may either receive data to be processed (e.g., from the Master), or it may retrieve it on its own (e.g., retrieve one or more local or network files containing the data). In cases under which data is provided by the Master, the Master will either retrieve the data to be processed (either locally or from a remote location) or otherwise generate it, such as generating an array of data to be processed with initial values. For data that is provided by the Master to the Slaves, the process is similar to the operations and logic for sending data from the Slaves to the Master described below, except the data is being sent from the Master to the Slaves rather than from the Slaves to the Master.

After processing the data, Process A begins execution of slave code block 116 in code section 114, which begins with a check to determine if the Process' rank is >0. Since it is, Process A continues execution at the for loop in slave code block 114, and iterates through the for loop until i=3, at which point my_rank=i is TRUE. (For all other iterations through the loop, my_rank=I is FALSE. Process A then proceeds to execute the MPI_Send (&buffer, 1000, MPI_DOUBLE, 0, tag_val, MPI_COMM_WORLD) instruction. &buffer is a pointer to a buffer address located at the start of the portion of data to be sent, 1000 is the number (count) of items of data, MPI_DOUBLE indicates each data item is a floating point number with double precision (in accordance with the MPI_DOUBLE datatype for the platform), 0, which corresponds to the rank of the destination, identifies the destination is rank 0, i.e., the Master node), tag_val is an integer tag value used for matching messages sent from a given sender at the receiver, and MPI_COMM_WORLD is the MPI communicator.

In further detail, MPI exposes a tag-matched message queue as its primary form of inter-process communication. When a message is sent, a tag value is included as part of the message header. The receiving process maintains a receive queue containing a list of receive buffers, each with an associated tag value. When messages arrive, this receive queue is traversed looking for matching tags.

For simplicity, the tag values in the example of FIG. 1 are simply labeled tag_val. In actual practice, a given sender may send multiple messages, and the tag value from a given sender will be different for each message that may be sent prior to completing processing of a prior sent message at the receiver. It is also possible to have a function within the MPI_Recv function (or a call to such a function) that calculates the tag value. For example, the function could combine the rank with an ordered message sent by the rank, such as tag=rank*size+j, where j is the message number in an ordered set of messages. Also, depending on the MPI library use for the actual implementation, the combination of the source, tag value, and MPI communicator are used to match message tags.

The foregoing is further illustrated in FIG. 1, wherein Process A includes an application SEND function 120 depicting a message 102 including a tag 122 and (payload) data 124. An MPI message consists of a data payload plus an envelope containing metadata, as depicted by an envelope 126 including a source 128, a destination 130, a tag 122, and a communicator 132. Source 128 and destination 130 indicate which process the message is coming from and going to. The source 128, tag 122, and communicator 132 are used to match a send operation to a particular receive operation. Unlike TCP sockets, which model a stream of data, MPI allows for messages to be delivered directly to specific buffers. Receive operations are posted to a pending receive queue where they await incoming messages. As each message arrives, its envelope is compared to each of the queued receives. The message is delivered (copied) into the first matching receive.

To facilitate receiving data, MPI defines various receive functions, such as MPI_Recv and MPI_Irecv. An MPI receive function is the half of an MPI send function that is implemented on the receiving process, and MPI programs are coded to match MPI receive and send functions in a pairwise manner for the two inter-communicating processes, as discussed above.

Concurrent to Process A executing application code 110a, Process B executes application code 110b. As before, the MPI_Init and MPI_comm_size(MPI_COMM_WORLD, &size) instructions are executed, and the processing proceeds to data receive/retrieve and processing section 113. Since Process B corresponds to the Master, the portion of code corresponding to the (M)aster is executed. As discussed above, in some application the master may retrieve data from a local or remote storage location and send corresponding data to be processed by the slaves (via MPI_Send messages, for example). Optionally, the slaves can retrieve their own data. As yet another option, the master may perform some of the data processing operations and retrieve its own data in a manner similar to the slaves.

Next, Process B continues to begin execution of slave code block 116 of code section 114. This time, when my_rank>0 is checked, the answer is FALSE, resulting in the for loop in slave code block 114 being skipped. Execution then proceeds to check if my_rank=0 in master code block 118. In this case, the answer is TRUE (since Process A has a rank of 0), and the for loop in master code block 118 is executed. For each iteration the Master executes an MPI_Recv (&buffer, 1000, MPI_DOUBLE, i, tag_val, MPI_COMM_WORLD, &status) instruction. In this case, &buffer is a pointer to a buffer address at which the data is to be buffered, 1000 indicates the count of data items, MPI_DOUBLE defines the data type of the data items as double-precision floating point, tag_val indicates the tag value, MPI_COMM_WORLD specifies the MPI communicator, and &status is a pointer to the status of the message (which is generally used for error detection).

Generally, the process on the receive side (Process B in this example), will allocate one or more buffers for which data will be buffered for use by the application, such as during part of the initialization process (not shown), although buffers may be dynamically allocated subsequent to the initialization process, as well. In FIG. 1, the receive operation is depicted by an application RECV function 136, and the application has allocated an application receive buffer 138. Depending on the particular MPI application and the MPI processes involved, MPI operations may be configured such an application receive buffer and/or location in an application receive buffer may be determined based on the &buffer pointer in combination with other information in the message, or the message data may be written to a particular buffer that has been allocated for receiving data from a particular MPI node.

In one embodiment, when Process B executes the MPI_Recv (&buffer, 1000, MPI_DOUBLE, i, tag_val, MPI_COMM_WORLD, &status) instruction, it posts matching data to a data structure (e.g., a matching entry in a list or queue) referred to as a matching receive (entry) that is used for matching received messages with where the data contained in the messages is to be written. Under a historical approach, the criteria used for matching is a combination of the source and the tag, which can be used to uniquely identify a message.

Under the scheme illustrated in FIG. 1, when an MPI message is received, it is first buffered in system buffer 108. For example, when message 102 is received over network 103, the message is initially buffered in system buffer 108. The message envelope 126 is then inspected to identify the source 128 and the tag 122, which is used to detect if there is a matching receive entry in the receiving process' list or queue. If there is a match, the data is then written to the appropriate application receive buffer (and/or location within an application receive buffer that is to receive data from multiple MPI nodes) identified by the matching receive entry. This is depicted in FIG. 1 as data 124 being copied from system buffer 108 to application receive buffer 138. If the MPI_Recv instruction for the corresponding message has yet to be executed, there will be no match. As a result, data 122 will remain in system buffer 108 until the corresponding MPI_Recv instruction is executed, at which point data 122 will be copied into application receive buffer 138. The data that is buffered (data 124) may then be accessed by application RECV function 136, as illustrated.

The foregoing scheme generally works fine for most messages. However, as described above, the execution of the processes on the various MPI nodes is asynchronous. In addition, prior to sending data, each MPI slave node will generally perform some sort of processing to generate the data (e.g., some predefined algorithm/function). Moreover, the workload for a given MPI slave node may differ from other slave nodes (depending on the work/algorithm/function it is defined to perform, and the data being processed). As a result, the order in which slaves will send back data is often unpredictable. In addition, depending on the implementation, a master may also be used to perform data generation operations. To complicate matters further, sometimes that master is bombarded with messages from the slaves, resulting in a temporary workload at the master that is much greater than the workload at the slaves.

As a result of the foregoing, the processing at the slaves and at the master can get out of sync, with the slaves getting ahead of the master. This further may lead to race conditions, as explained below. When the processing at a slave is ahead of the master, the slave may send messages containing data for which receive buffers have yet to be posted, and thus a situation results where there is no matching receive.

A key part of MPI is how it handles messages when there is no matching receive. A message is considered expected if a matching receive (as indicated by its associated tag) is already posted when it arrives at the destination process. If no such receive exists, the message is unexpected. MPI specifies that unexpected messages are queued until a matching receive is posted.

Figure 2:
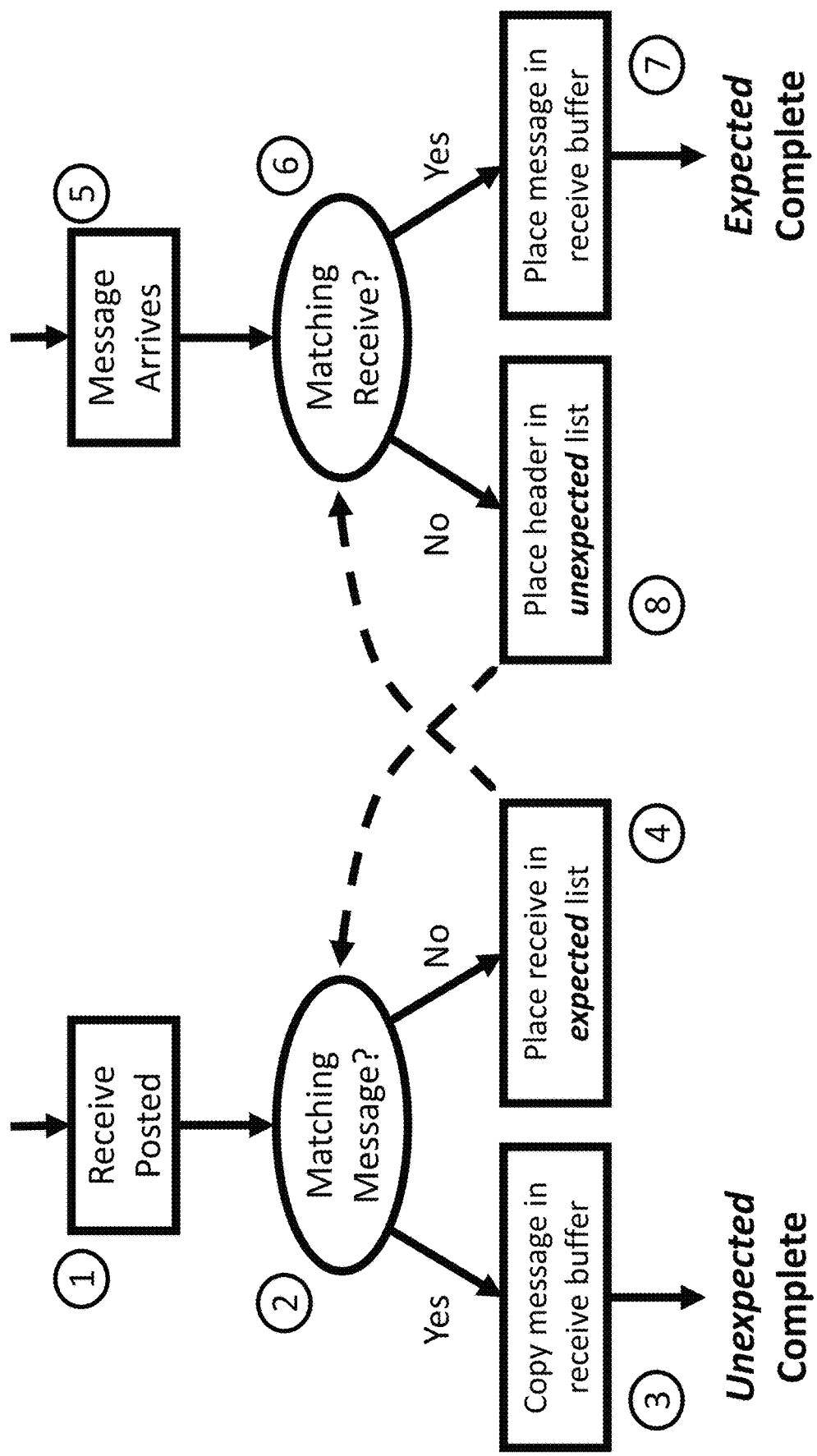
FIG. 2 is a diagram illustrating how MPI handles expected and unexpected messages.

This is schematically illustrated in FIG. 2, where the diagram illustrates the flow of messages from a receiver's perspective. Receive operations specify a data buffer and envelope information (1). When a receive is posted, the unexpected message queue is searched (2). If an unexpected match is found, the message data is placed in the receive buffer and the receive operation is completed (3). Otherwise the receive is queued in an expected receive list (4).

When a message arrives (5), the expected receive list is searched for a match (6). If an expected match is found, the message is delivered and the receive is completed (7). Otherwise the message is queued in a separate unexpected message list (8).

As explained above, the receiver maintains a receive queue of tags corresponding to receive buffers that have been posted. If an incoming message is not matched in the receive queue, it is placed in an unexpected message queue. As new receive buffers are posted, this unexpected list is first checked for matches. If a message is matched from the unexpected list, the receive is immediately completed and does not go into the receive list.

When a message arrives unexpectedly, the MPI implementation must decide what to do with the message data. The message envelope is a small constant size and is required for matching, but the data is potentially very large. For large messages, it is not feasible to immediately buffer unexpected message payloads at the receiver due to memory requirements. Instead, the sender issues a ready-to-send (RTS) control message containing matching information (also referred to as a descriptor, which contains that tag to be used to identify the subsequent message). The receiver responds with a clear-to-send (CTS) only after it has matched the message to the descriptor's tag in the receive queue. After the CTS is received, the data is sent from the sender to the receiver. This sequence is commonly referred to as a rendezvous protocol.

Figure 3:
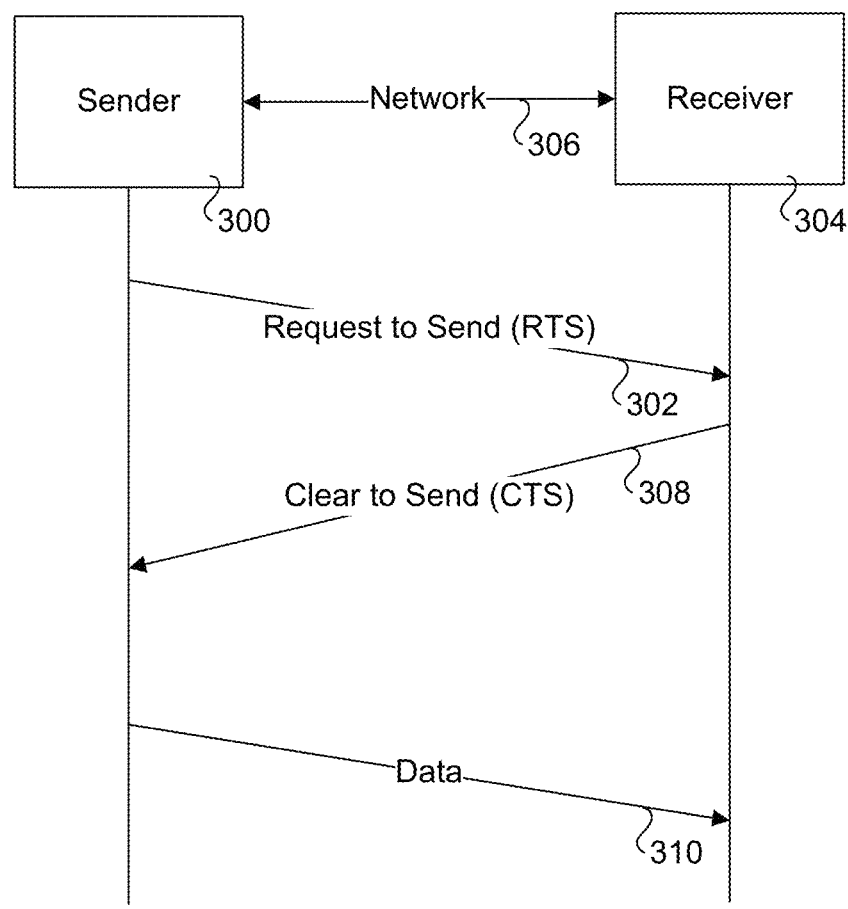
FIG. 3 is a message flow diagram illustrating transfer of a data from a sender to a receiver using a Request to Send (RTS), and a Clear to Send (CTS), followed by sending of the data.

This is schematically illustrated in FIG. 3, where a sender 300 sends an RTS control message 302 to a receiver 304 over a network 306. In response to receiving the RTS control message 302, receiver 304 returns a CTS control message 308 after it has matched the message to a tag in the receive queue. Upon receiving CTS control message 308, sender 300 sends a message containing the payload data 310 to receiver 304.

The details of the data transfer vary depending on the particular network interface. The CTS can include special information (such as a unique tag or separate communication channel) that the sender cooperatively uses to direct the data straight to the matched receive buffer. On Portals-based networks, the receiver issues an RMA GET operation to pull unexpected message data from the sender. This approach requires no software response to the RMA GET (effectively the CTS) on the sender. The downside of this protocol is that the sender must expose its send buffer to remote access before issuing the RTS. The send buffer is made available to the remote process by registering it with the hardware in an operation similar to that used for posting receives. The exposure operation takes time, during which the sender is not actually sending any data. The result is overhead, or a performance penalty.

Figure 4:
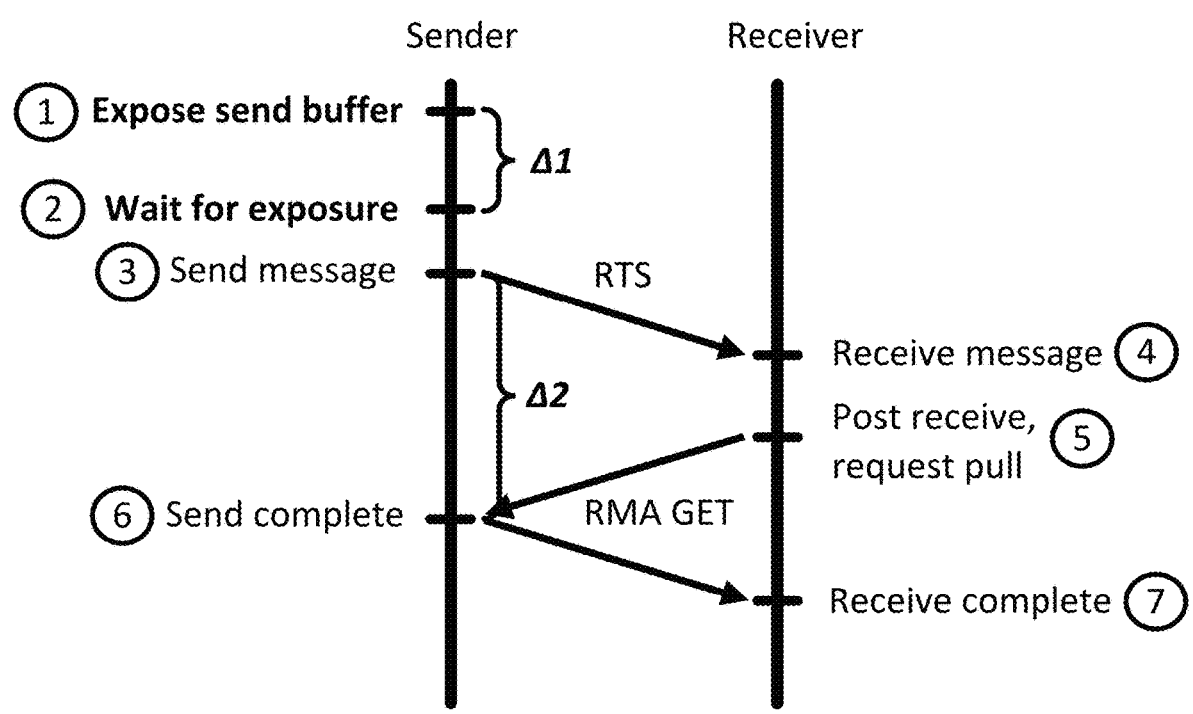
FIG. 4 is a message flow diagram illustrating an existing rendezvous protocol under which a send buffer is exposed prior to sending an RTS message.

An example of the existing process is shown in FIG. 4. The costs the sender must incur to accommodate for unexpected arrival of the message at the receiver are shown in bold. First, the sender issues a local hardware request to expose its send buffer to remote access (1). In order to prevent a receiver from potentially trying to pull the message data before it is exposed, the sender must wait for the hardware to complete the exposure (2) before initiating the send (3). When the message arrives at the receiver (4), the targeted network interface searches for a matching receive buffer. If one is found, the message is considered expected, and delivered directly to the receive buffer. Otherwise, the message is unexpected. When a matching receive is posted (5), the receiver issues a CTS (e.g., an RMA GET) to begin the data transfer. Both the send (6) and receive (7) are considered complete when the RMA GET completes.

The sender cannot know whether its message will be expected, so it must pay the cost of exposing the send buffer even if it turns out to be unnecessary (e.g., the message is expected). Under embodiments of an improved protocol disclosed herein, instead of forcing the sender to wait for the send buffer exposure operation to complete, the RTS is immediately sent to begin the protocol, prior to (or in conjunction with initiation of) exposing the send buffer. The result is better performance due to overlap of the memory exposure with network latency and response delays at the receiver.

Figure 5A:
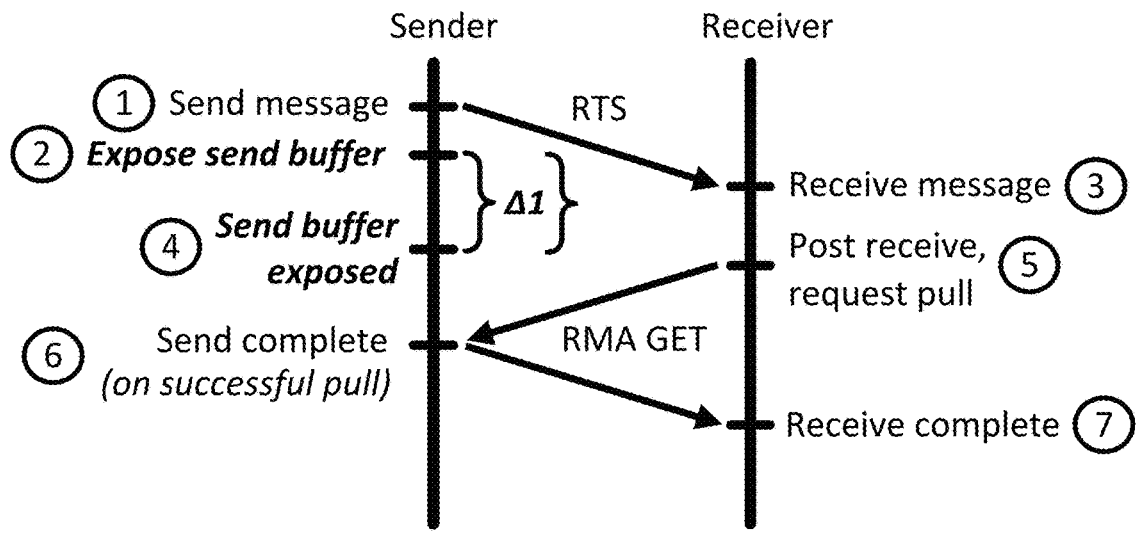
FIG. 5*a* is a message flow diagram illustrating an first embodiment of an improved rendezvous protocol under the RTS message is sent immediately, prior to or in conjunction with initiating exposure of the send buffer.
Figure 5B:
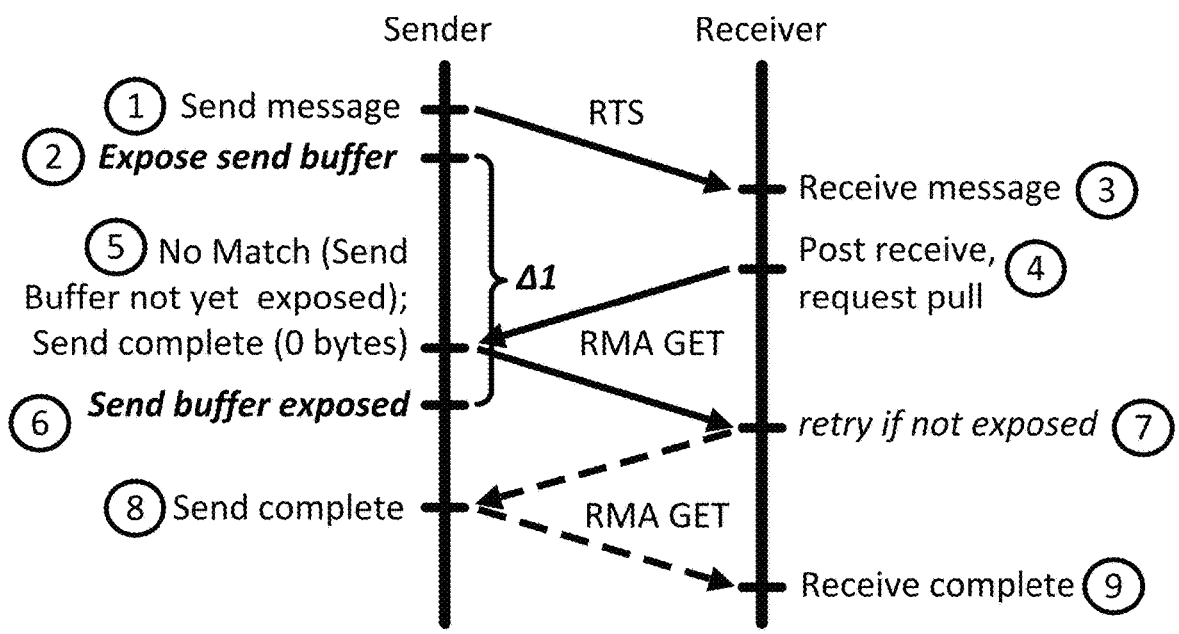
FIG. 5*b* is a message flow diagram illustrating a second embodiment of an improved rendezvous protocol under the RTS message is sent immediately, prior to or in conjunction with initiating exposure of the send buffer, further wherein a retry mechanism is implemented if the send buffer hasn't been exposed by the time in RMA GET message is received at the sender.

Embodiments illustrating exemplary operations relating to transfer of data from a sender to a receiver are shown in FIGS. 5a and 5b. In FIG. 5a, the sender initiates the transfer immediately (1) and then exposes the send buffer (2). As before, when the message arrives at the receiver (3), the targeted network interface searches for a matching receive buffer. In this case, the message is unexpected, resulting in the receiver posting a matching receive (5), and issuing an RMA GET to begin the data transfer. Meanwhile, the send buffer has been exposed (4), such that when the RMA GET is received, the sender is able to return the payload data. As before, the send (6) and receive (7) are considered complete when the RMA GET completes.

Reordering these operations exposes a potential race in which the receiver may respond with an RMA GET to pull the data before the sender's network interface exposes the send buffer. This is illustrated in FIG. 5b, wherein the send buffer has yet to be exposed by the time a first RMA GET message sent by the receiver (4) is received by the sender (5), resulting in a no match condition. This race condition is handled by enabling the receiver to check for the error and retry (7) the RMA GET until it succeeds (8) and (9). In one embodiment, the sender returns a Send complete message in response to the RMA GET with the length in Bytes of the returned data=0, indicating there was no matching entry (and thus the send buffer has yet to be exposed). By the time the retried RMA GET is received at the receiver (8), the send buffer has been exposed (6). As a result, the retried RMA GET results in a completion (8) and (9).

Initiating the send immediately results in improved performance; the cost of exposing the send buffer for unexpected receives is overlapped with the send. As illustrated in FIG. 5b, the receiver may need to retry its pull request, but this can only happen if the message is unexpected, and even then is very unlikely due to the latencies involved.

The performance characteristics can be quantified using the following time deltas:

$\Delta 1$: Time taken for send buffer exposure $\Delta 2$: Time taken from initiation of send to arrival of RMA GET at sender $\Delta 3$: Time taken from an RMA GET denial to arrival of a successive retry at sender.

Figure 5C:
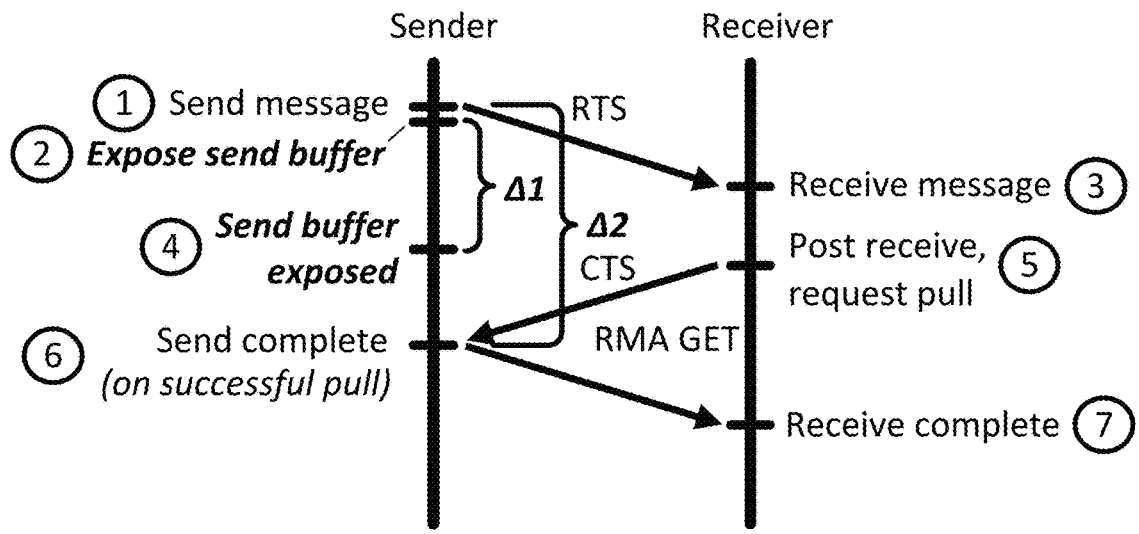
FIG. 5*c* is a version of the diagram of FIG. 5*a* with overlaid time deltas.
Figure 5D:
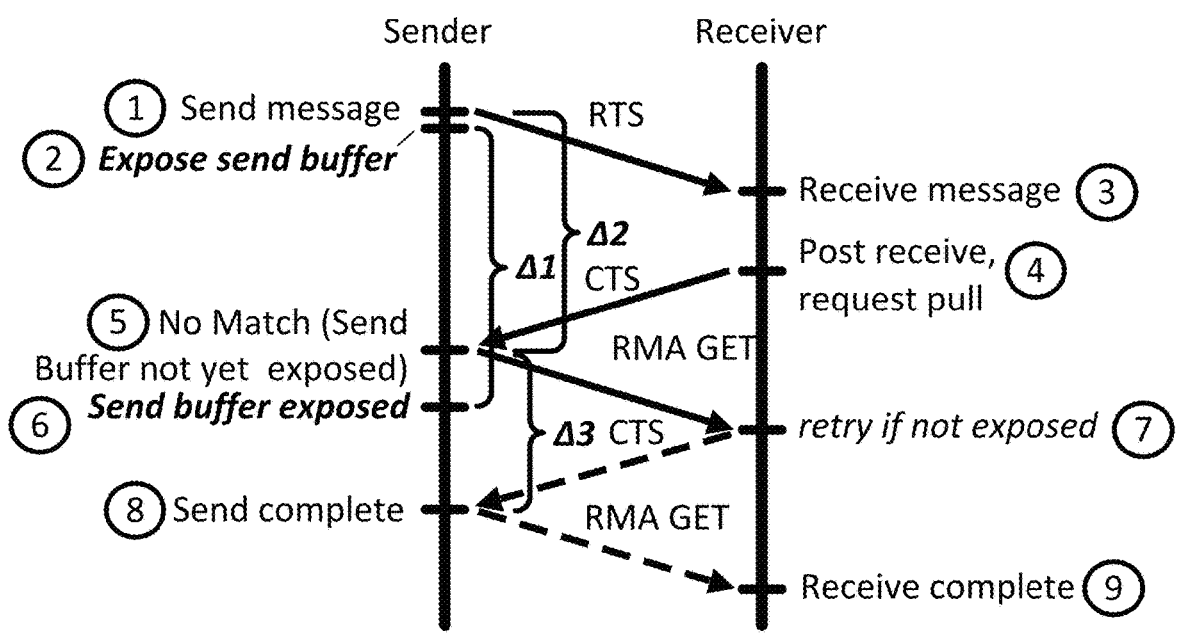
FIG. 5*d* is a version of the diagram of FIG. 5*b* with overlaid time deltas.

A version of the diagram in FIG. 5a with overlaid time deltas is shown in FIG. 5c, while a version of the diagram in FIG. 5b with overlaid time deltas is shown in FIG. 5d.

Note that $\Delta 2$ includes the time at the receiver where the message waiting in the unexpected list before a receive is posted. This time can be arbitrarily long depending on application behavior. $\Delta 3$ also requires software interaction at the receiver to detect the RMA GET denial and retry it. Similarly, the application may impose an arbitrarily long delay before it enters the network protocol software to advance the state.

The time taken from the start of the send to arrival of the CTS at the sender is $\Delta 1 + \Delta 2$ for the prior solution. If $\Delta 2 > \Delta 1$ (no retry), then our solution reduces the time to CTS to $\Delta 2$. If $\Delta 2 < \Delta 1$ (retry occurs), the worst-case cost is $\Delta 1 + \Delta 3$. $\Delta 1$ and $\Delta 3$ can overlap since the RMA GET denial can happen any time before $\Delta 1$ completes; that is, the additional cost of the try can vary anywhere from almost zero to $\Delta 3$.

Consider what must happen for retry to occur ($\Delta 2 < \Delta 1$). $\Delta 2$ encompasses two trips across the network (RTS and CTS) plus time spent waiting for a (by definition, unexpected) match. $\Delta 1$ is an operation local to the sender's network interface. In practice, the retries occur rarely if at all. A retry ($\Delta 3$) does incur the same potentially heavy cost of application software imposed delays as $\Delta 2$, but since retries are rare, so is the frequency of incurring the $\Delta 3$ cost.

In summary, the techniques disclosed herein improves the performance of the rendezvous protocol by overlapping the memory exposure with the RTS/CTS handshake. Doing so exposes a rare race condition, but this is covered by retrying the CTS and data transfer until it succeeds.

Exemplary Improved Rendezvous Protocol Embodiments with Portals 4

The following is a detailed discussion embodiments implementing the improved rendezvous scheme using Portals 4. To better understand how the implementation works, a primer on the operations of Portal 4 is first provided. The following description and associated Figures are described and illustrated in *The Portals* 4.1 *Network Programming Interface,* Sandia Report SAND2017-3825, April 2017.

Portals 4 (current specification Portals 4.1) is a network programming interface and associated API (application program interface) and libraries that support scalable, high-performance network communication between nodes of a parallel computing system. Portals 4 represents an adaption of the data movement layer developed for massively parallel processing platforms. Version 4 is targeted to the next generation of machines employing advanced network interface architectures that support enhanced offload capabilities. Portals provides an interface to support both the MPI standard as well as the various partitioned global address space (PGAS) models, such as Unified Parallel C (UPC), Co-Array Fortran (CAF), and SHMEM.

Portals aims to provide a scalable, high performance interface network programming interface for HPC systems. Portals support scalability and performance goals by supporting network architecture properties including connectionless, network independent, user-level flow control, and operating system (OS) bypass. The following are properties of a network architecture that avoid scalability limitations for an implementation of MPI:

- Receiver-managed—Sender-managed message passing implementations require a persistent block of memory to be available for every process, requiring memory resources to increase with job size.
- User-level bypass (application bypass)—While OS bypass is necessary for high performance, it alone is not sufficient to support the progress rule of MPI asynchronous operations. After an application has posted a receive, data must be delivered and acknowledged without further intervention from the application.
- Unexpected messages—Few communication systems have support for receiving messages for which there is no prior notification. Support for these types of messages is necessary to avoid flow control and protocol overhead.

Portals combines the characteristics of both one-sided and two-sided communication. In addition to more traditional "put" and "get" operations, they define "matching put" and "matching get" operations. The destination of a PUT (or send) is not an explicit address; instead, messages target list entries (potentially with matching semantics or an offset) using the Portals addressing semantics that allow the receiver to determine where incoming messages should be placed. This flexibility allows Portals to support both traditional one-sided operations and two-sided send/receive operations.

Portals allows the target to determine whether incoming messages are acceptable. A target process can choose to accept message operations from a specific process or all processes, in addition to the ability to limit messages to a specified initiator usage id.

A portal represents an opening in the address space of a process. Other processes can use a portal to read (GET), write (PUT), or perform an atomic operation on the memory associated with the portal. Every data movement operation involves two processes, the initiator and the target. The initiator is the process that initiates the data movement operation. The target is the process that responds to the operation by accepting the data for a PUT operation, replying with the data for a GET operation, or updating a memory location for, and potentially responding with the result from, an atomic operation.

Activities attributed to a process may refer to activities that are actually performed by the process or on behalf of the process. An implementation of Portals may use dedicated hardware, an operating system driver, a progress thread running in the application process, or some other option to generate the reply.

Figure 6A:
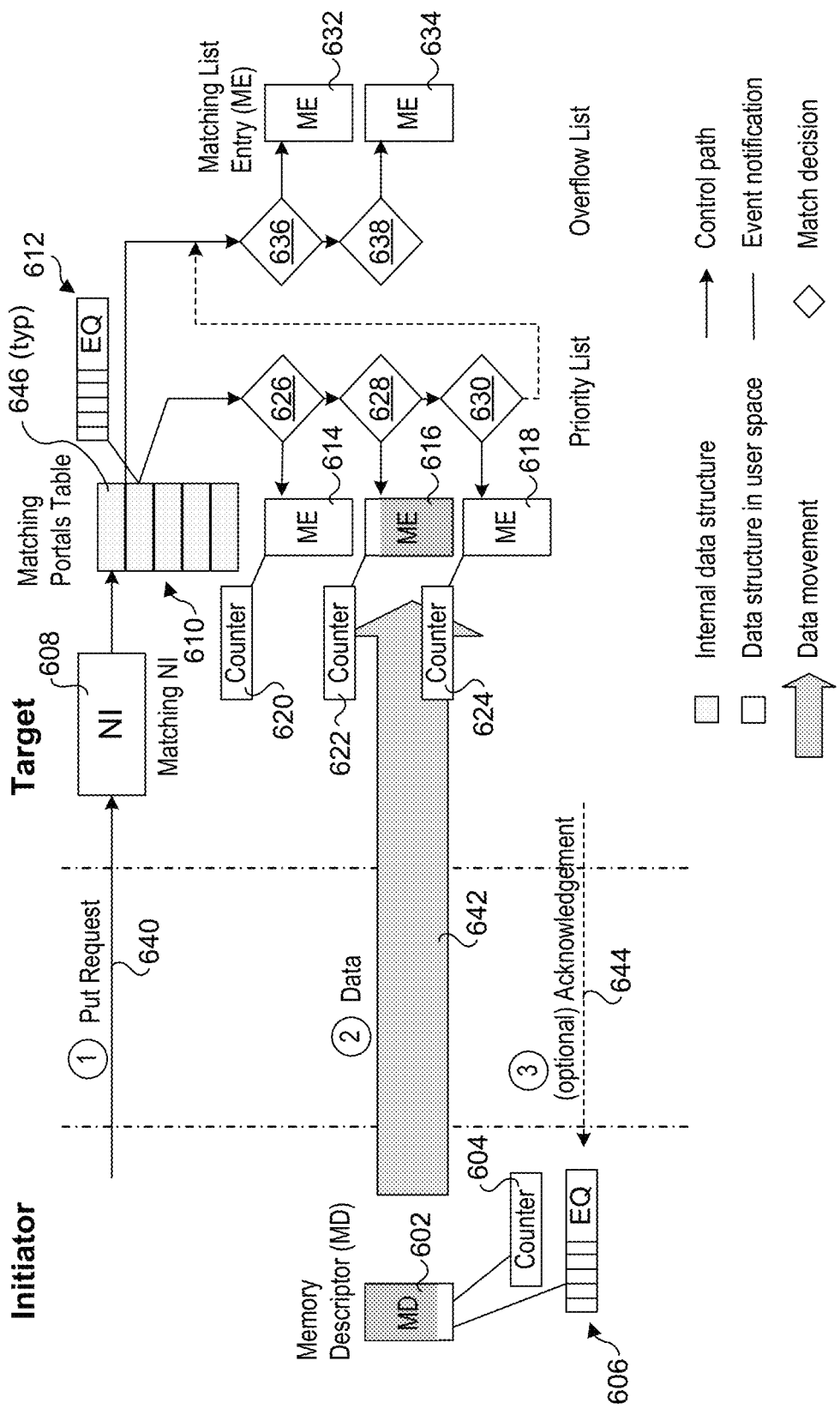
FIG. 6*a* is a diagram illustrating a conventional implementation of a Portals PUT message.

FIG. 6a shows a graphical representation 600 of a Portals PUT operation under which an initiator is enabled to send data to a target. The representation of the initiator includes a memory descriptor (MD) 602, a counter 604, and an event queue (EQ) 606. The representation of the target includes a network interface 608, a matching portals table 610, and an event queue 612. The target also implements a priority list and an overflow list. Components for implementing the priority list include multiple matching list entries (MEs), depicted as MEs 614, 616, and 618, each with a respective counter 620, 622, and 624, and associated with a respective match decision 626, 628, and 630. Components for implementing the overflow list include MEs 632 and 634 and associated match decisions 636 and 638.

As further illustrated, the initiator sends a PUT request message 640 to the target, as depicted by a first operation '1' (operations in the Figures herein are depicted by encircled numbers). The target translates the portal addressing information in the request using its local portals structures. PUT request message 640 also includes a memory descriptor that includes a 'tag' that is used for matching list entries. A PUT request may include data as part of the same packet as the PUT request or that data may be sent in one or more in separate packet(s), such as shown by data 642 and data movement operation '2' in FIG. 6. When data 646 has been PUT into the remote memory descriptor (matching the memory descriptor sent with PUT message 640), or has been discarded), the target optionally sends an acknowledgment ③ message 644, as depicted in operation '3.'

Under Portals 4, a message targets a logical network interface and a user may instantiate up to four logical network interfaces associated with a single physical network interface. A portals physical network interface is a per-process abstraction of a physical network interface (or group of interfaces). Logical network interfaces may be matching or non-matching and addressed by either logical (rank) or physical identifiers. Under the embodiments disclosed herein, the sending and receiving of messages are coordinated such that PUT and GET messages are always sent to matching network interfaces; accordingly, the portals structures for handling non-matching network interfaces are not shown in FIG. 6.

Another second important concept illustrated in FIG. 6a is that each portal table entry 646 (such as depicted in matching portals table 610) has three data structures attached: an event queue (612), a priority list, and an overflow list. The final concept illustrated in FIG. 6a is that the overflow list is traversed after the priority list. If a message does not match in the priority list (matching interface) or it is empty (either the matching network interface or non-matching network interface (not shown)), the overflow list is traversed.

The space the Portals data structures occupy is divided into protected and application (user) space, while the large data buffers reside in user space. Most of the Portals data structures reside in protected space. Generally, the Portals control structures may reside inside the operating system kernel or the network interface card (NIC), or elsewhere in a protected space).

Figure 6B:
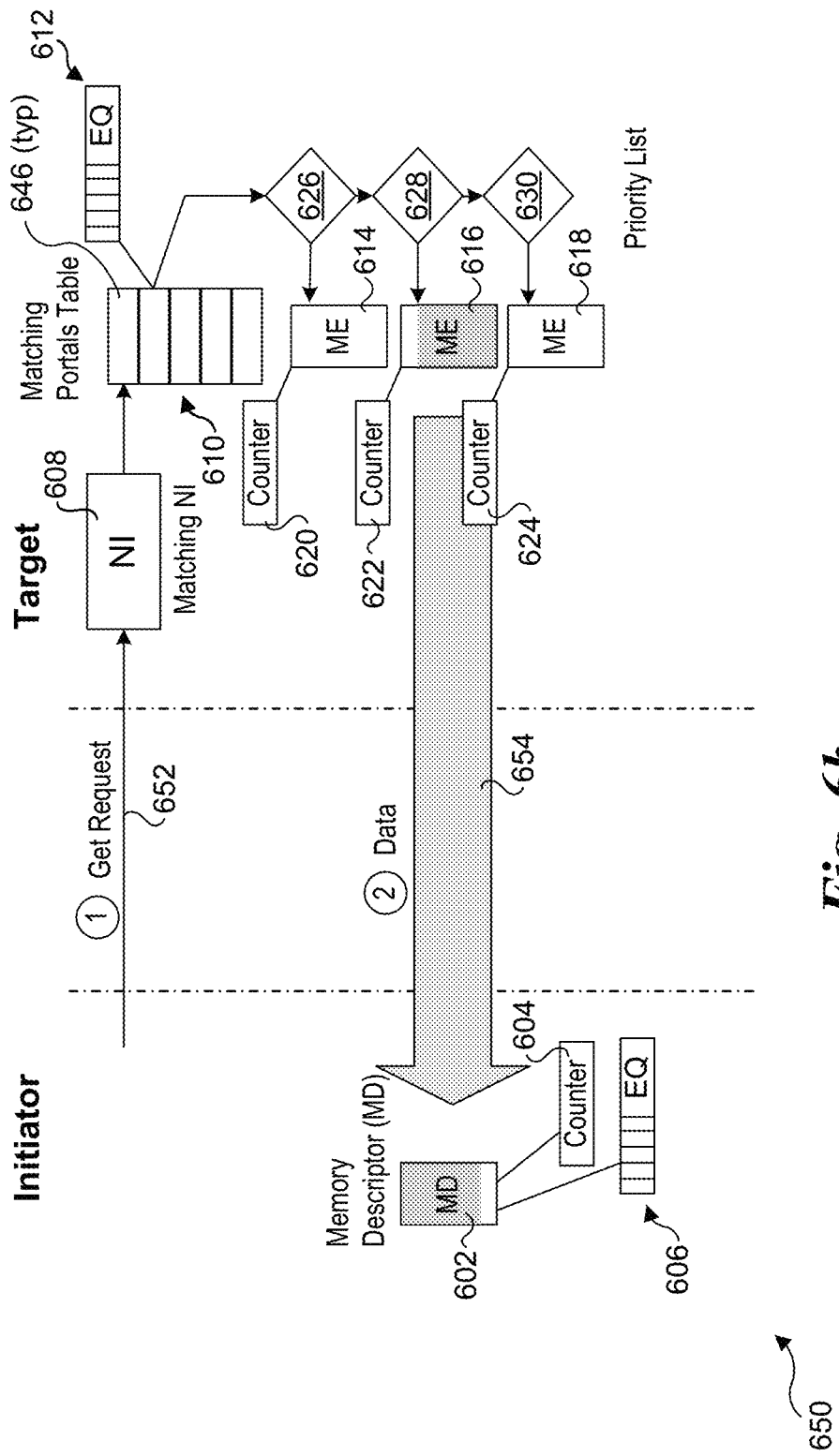
FIG. 6*b* is a diagram illustrating a conventional implementation of a Portals GET message from a match list entry.

FIG. 6b shows a representation 650 of a GET operation from a target that does matching. First, the initiator sends a GET request 652 ① to the target, as identified by an operation '1.' As with the PUT operation, the target translates the portals addressing information in the request using its local portals structures. Once it has translated the portals addressing information, the target sends a reply 654 that includes the requested data, as depicted by a second operation '2.'

One-sided data movement models typically use a process identifier and remote address to identify a memory address on a remote node. In some cases, the remote address is specified as a memory buffer identifier and offset. The process identifier identifies the target process, the memory buffer identifier specifies the region of memory to be used for the operation, and the offset specifies an offset within the memory buffer.

Portals lists provide one-sided addressing capabilities. Portals list entries serve as a memory buffer identifier that may be persistent or optionally removed from the list after a single use. Traditional one-sided addressing capabilities have proven to be a poor fit for tagged messaging interfaces, such as the Message Passing Interface. To overcome these limitations, Portals also supports match list entries, which include additional semantics for receiver-managed data placement, as discussed below.

FIG. 7 shows a graphical representations of the portal structures used by a target in the interpretation of a portals address using Portals matching address structures. In addition to the logic shown in FIG. 7, the initiator's physical network interface and the specified target node identifier are used to route the message to the appropriate node and physical network interface. The initiator's logical network interface and the specified target process ID are used to select the correct target process and the logical network interface. Each logical network interface includes a single portal table used to direct message delivery. A logical rank can be substituted for the combination of node ID and process ID when logical endpoint addressing is used.

An initiator-specified portal index is used to select an entry in the portal table. Each entry of the portal table identifies three lists and, optionally, an event queue. The priority list and overflow list provide lists of remotely accessible address regions. Applications may append new list entries to either list, allowing complex delivery mechanisms to be built. Incoming messages are first processed according to the priority list and, if no matching entry was found in the priority list, are then processed according to the overflow list. In addition to providing an insertion point in the middle of the combined list structures by allowing insertions at the end of both the priority and overflow lists, the overflow list carries additional semantics to allow unexpected message processing.

The third list that is associated with each portal index is more transparent to the user and provides the building blocks for supporting unexpected messages. Each time a message is delivered into the overflow list, its header is linked into the unexpected list, as illustrated in FIG. 7 as a linked list including headers (HDR) 702 and 704. The user cannot insert a header into the unexpected list, but can search the list for matching entries and, optionally, delete the matching entries from the list. Further, when a new list entry is appended to the priority list, the unexpected list is first searched for a match. If a match is found (i.e., had the list entry been on the priority list when the message arrived, the message would have been delivered into that list entry), the list entry is not inserted, the header is removed from the unexpected list, and the application is notified a match was found in the unexpected list. A list entry in the overflow list may disable the use of the unexpected list for messages delivered into that list entry. All unexpected messages associated with a list entry must be handled by posting matching list entries in the priority list or searching and deleting prior to PtlLEUnlink( ) or PtlMEUnlink( ) successfully unlinking the overflow list entry. Unlike incoming messages, no permissions check is performed during the search of the unexpected queue. Therefore, the user is responsible for ensuring that the overflow list provides sufficient protection to memory and any further permissions checks must be performed by the user based on the overflow event data.

In addition to the standard address components (process identifier, memory buffer identifier, and offset), a portals address can include information identifying the initiator (source) of the message and a set of match bits. This addressing model is appropriate for supporting traditional two-sided message passing operations. Specifically, the Portals API provides the flexibility needed for an efficient implementation of MPI-1, which defines two-sided operations, with one-sided completion semantics.

For a matching logical network interface, each match list entry specifies two bit patterns: a set of "do not care" bits (ignore bits) and a set of "must match" bits (match bits). Along with the source node ID (NID) and the source process ID (PID), these bits are used in a matching function to select the correct match list entry. In addition, if truncation is disabled, the message must fit in the buffer. If the message does not fit, the message does not match that entry and matching continues with the next entry.

In addition to initiator-specified offsets, match list entries also support locally managed offsets, which allow efficient packing of multiple messages into a single match list entry. When locally managed offsets are enabled, the initiator-specified offset is ignored. A match list entry may additionally specify a minimum available space threshold (min free), after which a persistent match list entry is automatically unlinked. The combination of locally managed offsets, minimum free thresholds, and overflow list semantics allow for the efficient implementation of MPI unexpected messages.

Figure 8:
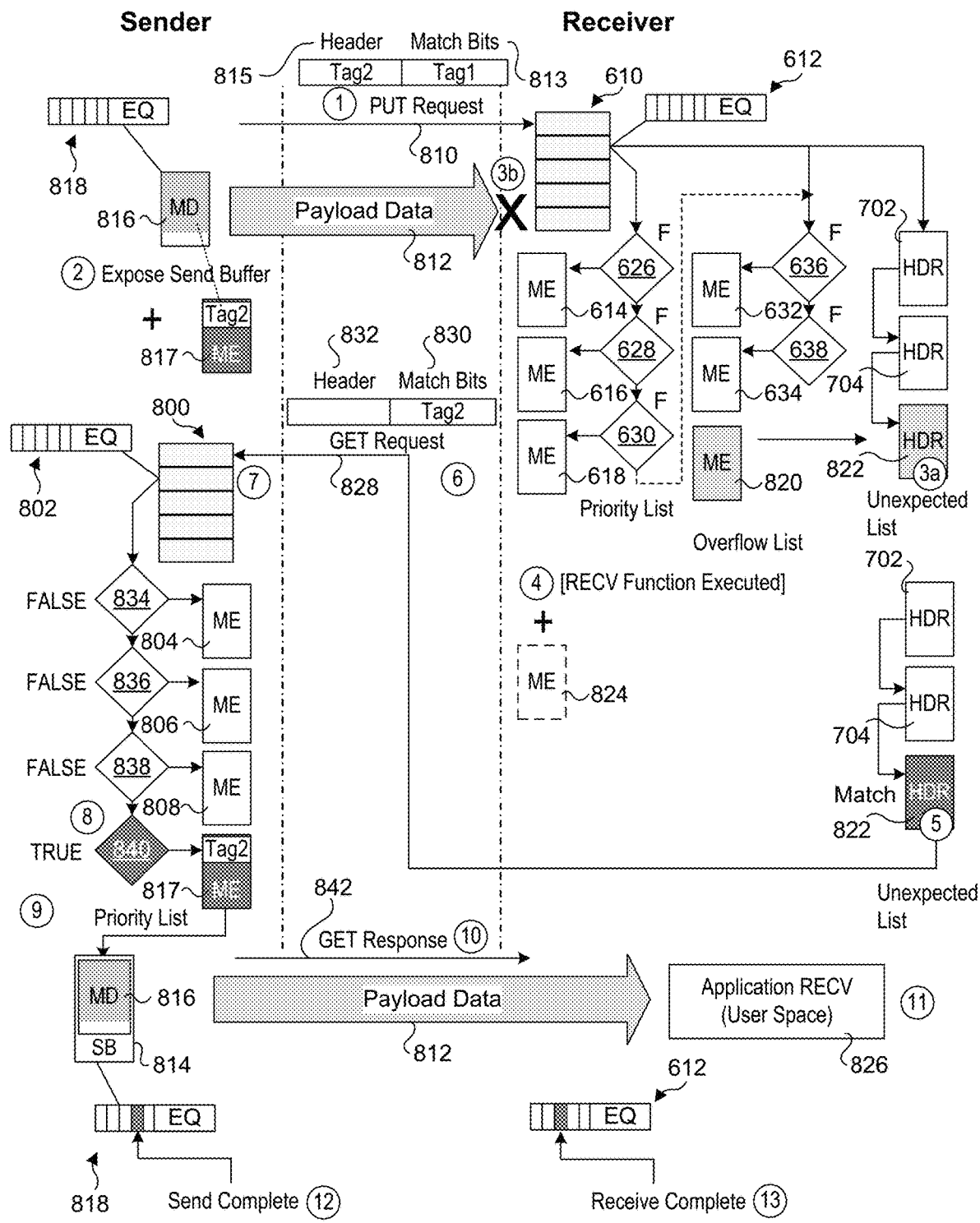
FIG. 8 is a combined message flow and data structure diagram illustrating an embodiment of an improved rendezvous protocol implemented using the Portals Network Programming Interface under which a Portals PUT request message is unexpected.

FIG. 8 shows a Portals message flow diagram corresponding to one embodiment of the improved rendezvous scheme under which a Portals PUT request message is unexpected. As before, payload data is to be transferred from a sender to a receiver. The initial state of the receiver is similar to the state of the target in FIG. 7. The sender includes various Portals data structures and associated objects including a matching portals table 800, an event queue 802, and three MEs 804, 806, and 808. As with the receiver, the sender also employs an overflow list and unexpected list (not shown).

The process begins (1) with sender sending a PUT request message 810 including payload data 812 comprising data that is copied from a send buffer (SB) 814 having a memory range defined by a memory descriptor 816. Under the Portals diagrams in FIGS. 6a and 6b, the memory descriptors are shown as buffers containing data. In reality, a memory descriptor provides information identifying a buffer containing the data. Memory descriptor 816 further includes an event queue 818.

As illustrated, PUT request message 812 includes a pair of tags: Tag1 and Tag2. These tags comprise matching indicia (data to be used for matching with matching entries). As shown, in the illustrated embodiment, Tag1 is included as part of match bits 813, while Tag2 is included in a field in header 815. Tag2 also corresponds to memory descriptor 816 (or otherwise contains the same information as memory descriptor 816).

Immediately after the PUT request message 810 is sent (or in conjunction therewith), the Sender initiates exposure (2) of send buffer 814, which spans the memory region identified by memory descriptor 816. Under Portals, exposing a send buffer includes creating a matching entry that is added to the end of the priority list, as depicted by a matching entry 817. The matching entry includes Tag2 as its matching data. Once the matching entry is added, the send buffer has been exposed, as depicted by SB 814 toward the bottom of the left-hand side of FIG. 8. As discussed above, both of memory descriptor 816 and TAG2 contain data defining the memory region occupied by send buffer 814 (e.g., a starting address and a length of the buffer).

When PUT request 810 is received by the receiver, it is processed by first checking Tag1 for a match of any of the matching entries in the priority list and, overflow list. In this example, PUT request 810 is an unexpected message, and thus the answers to each of match decisions 626, 628, 630, 636, and 638 is FALSE (i.e., no match). Accordingly, a new HDR is linked from an ME in the overflow list to the unexpected list, as depicted by a new HDR 822 at (3a).

At this point, the process differs from the convention Portals protocol for handling unexpected messages. Under the conventional protocol, the new ME 820 would include data defining a memory range in a receive buffer on the receiver in which payload data 812 would be put (i.e., buffered) prior to the payload data being accessed by the receiver-side application process. However, under the embodiment of FIG. 8, the payload data is dropped without being buffered in a receive buffer, as shown by the 'X' at (3*b*).

At some point subsequent to 3*b* an application RECV function on the receiver is executed that is the companion to PUT request message 810. For example, in the context of MPI, this would be an MPI_Recv function having the same Tag1 value as PUT request message 810 and a source value indicating it is to be received from the Sender.

In response to executing the application RECV function, a new ME 824 is to be added to the priority list. However, before a new ME is added to the priority list, the headers in the unexpected list are searched for a match. In this case, there is a match with the tag in new HDR 822, as depicted at (5). As per the Portals protocol, if a header is matched in the priority list, a corresponding ME is not added to the priority list, hence ME 824 will not end up being added.

In response to detecting the matching header in the unexpected list, the Receiver initiates an RMA GET that will end up retrieving data from the sender and "directly" placing the data in a memory region in the application's user space that is accessible to the application RECV function, as depicted by application RECV buffer 826 in user space (e.g., an application's receive buffer). It will be understood that "directly" within this context means the data will not first be buffered in any of the buffers or memory regions associated with a matching list entry in the priority list; in practice, the RMA GET will be implemented via DMA facilities provided by the underlying platform(s) for the Sender and Receiver, which may involve some temporary buffering in the NICs or HFIs.

The RMA GET is initiated by sending (6) a GET request message 828 to the Sender. This time, match bits 830 includes Tag2 as the matching indicia, while there is no second tag in header 830. Upon receipt of (7) of GET request message 828, the Sender processes the message in a similar manner to processing of a GET request message in FIG. 6*b*. This begins by comparing Tag2 with each of the matching entries in the priority list in order, as depicted by matching decisions 826, 828, 830, and 832. The matching decision result for each of matching decisions 834, 836, and 838 is FALSE. However, since matching entry 817 includes a match value of Tag2, the answer to matching decision 840 (8) is TRUE.

When matching entry 816 was added in connection with exposing the send buffer, information (e.g., a base address plus a length) was added to matching entry 817 identifying the location of a send buffer 814 (or otherwise the location of a memory region within a send buffer). At (9) payload data 812 is read from send buffer 814 (or the identified memory region) and then transferred via a Get Response message 842 (10) returned to the Receiver. Upon receipt of Get Response message 842, payload data 812 is written (11) to application RECV buffer 826. Upon completing the sending of the payload data, a send complete event (12) is added to event queue 818 on the Sender (12), while upon completing receiving of the payload data a receive complete event is added to event queue 612 on the Receiver (13). Upon a successful send (identified by the send complete event), ME 817 is removed from the priority list using PtlMEUnlink( ).

In the rare event that the GET Request message is received prior to the send buffer being exposed, the GET Response will return information indicating its data payload has zero length, as discussed above with reference to FIG. 5*b*. Upon receiving this GET Response, the Get Request will be retried. This sequence may be repeated, if necessary, until the send buffer has been exposed.

Figure 9:
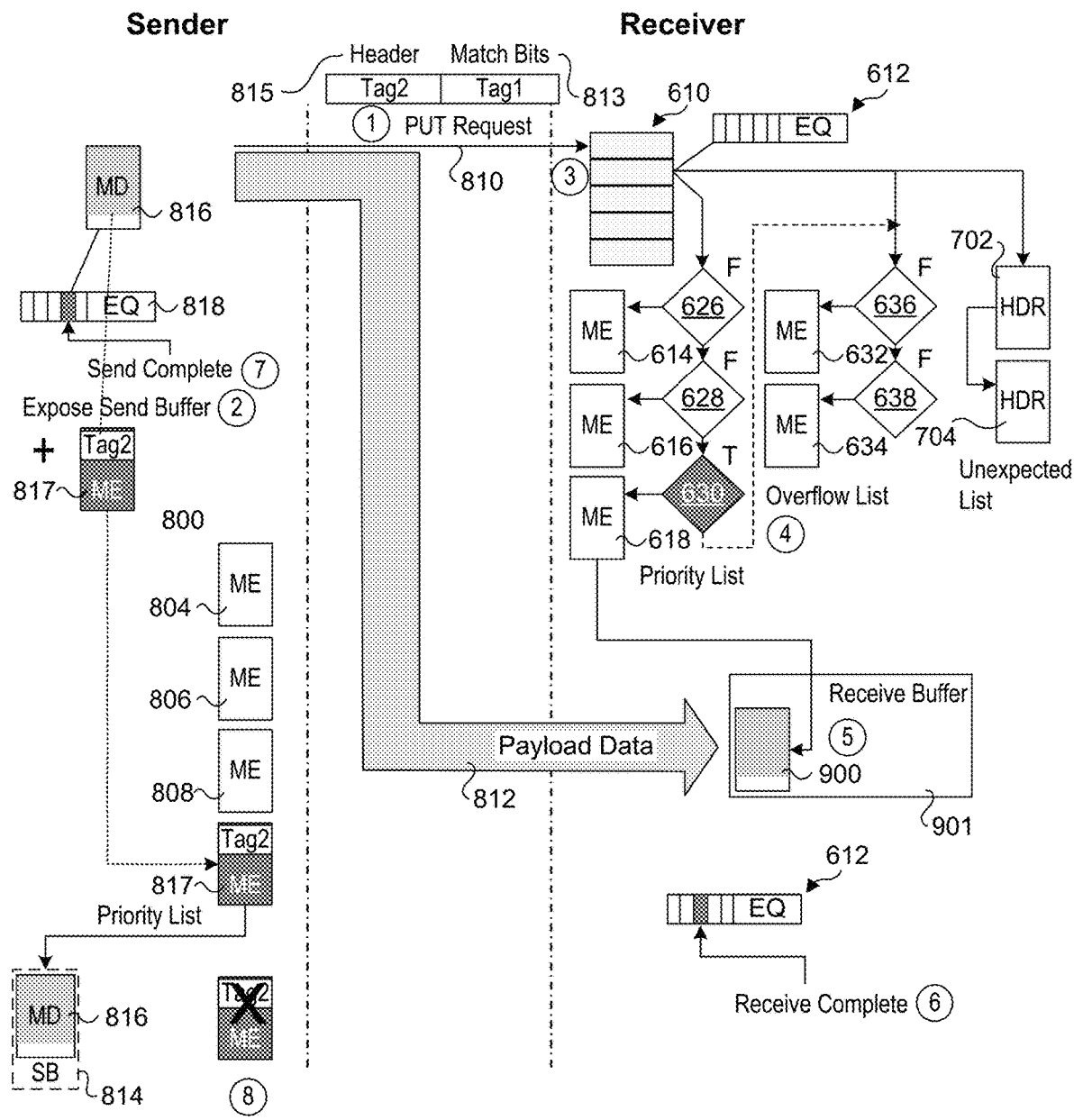
FIG. 9 is a combined message flow and data structure diagram illustrating an embodiment of an improved rendezvous protocol implemented using the Portals Network Programming Interface under which a Portals PUT request message is expected.

FIG. 9 shows a Portals message flow diagram corresponding to one embodiment of the improved rendezvous scheme under which a Portals PUT request message is expected. Generally, an expected Portals PUT request message is handled in a similar manner to that used under the conventional Portals protocol, except it is combined with exposing a send buffer in a similar manner as for the unexpected PUT request message in FIG. 8. While the send buffer gets exposed, it end up not being used and the ME used to expose it gets removed after a send complete event is detected.

As before, a PUT request message 810 is sent from the Sender to the Receiver at (1). The PUT request message 810 includes payload data 812 copied from send buffer identified by memory descriptor 816. At (2), exposure of send buffer 814 begins, which, as before, includes adding an ME 817 to the priority list with a tag value of Tag2.

At (3) the beginning of PUT request message 810, including header 815 and match bits 813 is received at the Receiver. The PUT request message 810 is then processed in the conventional manner, under which the priority list is checked, followed by the overflow list. In this case, the PUT request message is expected, and thus a corresponding ME will exist in the priority list, as indicated by ME 618 and match decision 630 at (4). ME 618 will include information (similar to a memory descriptor) that identifies a memory region 900 in a receive buffer 902 in which payload data 836 is to be buffered, with the buffering of payload data 812 being completed at (5). In response to detecting completion of receiving payload data 812, a completion event is added to event queue 612 at (6). At (7) a PUT complete event indicating the entire payload data was transferred is detected on the Sender, and ME 817, which was added to expose send buffer 814, is removed from the priority list at (8) using PtlMEUnlink( )

Exemplary Implementation Environments

Aspects of the embodiments described herein may be implemented in networks and/or systems employing various types of fabric and network architectures, including virtual networks. In one embodiment, an exemplary fabric employs an architecture that defines a message passing, switched, server interconnection network.

The architecture may be implemented to interconnect CPUs of computer platforms and other subsystems that comprise a logical message passing configuration, either by formal definition, such as a supercomputer, or simply by association, such a group or cluster of servers functioning in some sort of coordinated manner due to the message passing applications they run, as is often the case in cloud computing. The interconnected components are referred to as nodes. The architecture may also be implemented to interconnect processor nodes with an SoC, multi-chip module, or the like. One type of node, called a Host, is the type on which user-mode software executes. In one embodiment, a Host comprises a single cache-coherent memory domain, regardless of the number of cores or CPUs in the coherent domain, and may include various local I/O and storage subsystems. The type of software a Host runs may define a more specialized function, such as a user application node, or a storage or file server, and serves to describe a more detailed system architecture.

Generally, Host Fabric Interfaces (HFIs) minimally consist of the logic to implement the physical and link layers of the architecture, such that a node can attach to a fabric and send and receive packets to other servers or devices. HFIs include the appropriate hardware interfaces and drivers for operating system and VMM (Virtual Machine Manager) support. An HFI may also include specialized logic for executing or accelerating upper layer protocols and/or off-load of transport protocols, including the reliability operations implemented by the embodiments disclosed herein. An HFI also includes logic to respond to messages from network management components. Each Host is connected to the architecture fabric via an HFI.

In one embodiment, links are full-duplex, point-to-point interconnects that connect HFIs to switches, switches to other switches, or switches to gateways. Links may have different physical configurations, in circuit board traces, copper cables, or optical cables. In one embodiment the implementations the PHY (Physical layer), cable, and connector strategy is to follow those for Ethernet, specifically 100 GbE (100 gigabits per second Ethernet). The architecture is flexible, supporting use of future Ethernet or other link technologies that may exceed 100 GbE bandwidth. High-end supercomputer products may use special-purpose (much higher bandwidth) PHYs, and for these configurations interoperability with architecture products will be based on switches with ports with differing PHYs.

Figure 10:
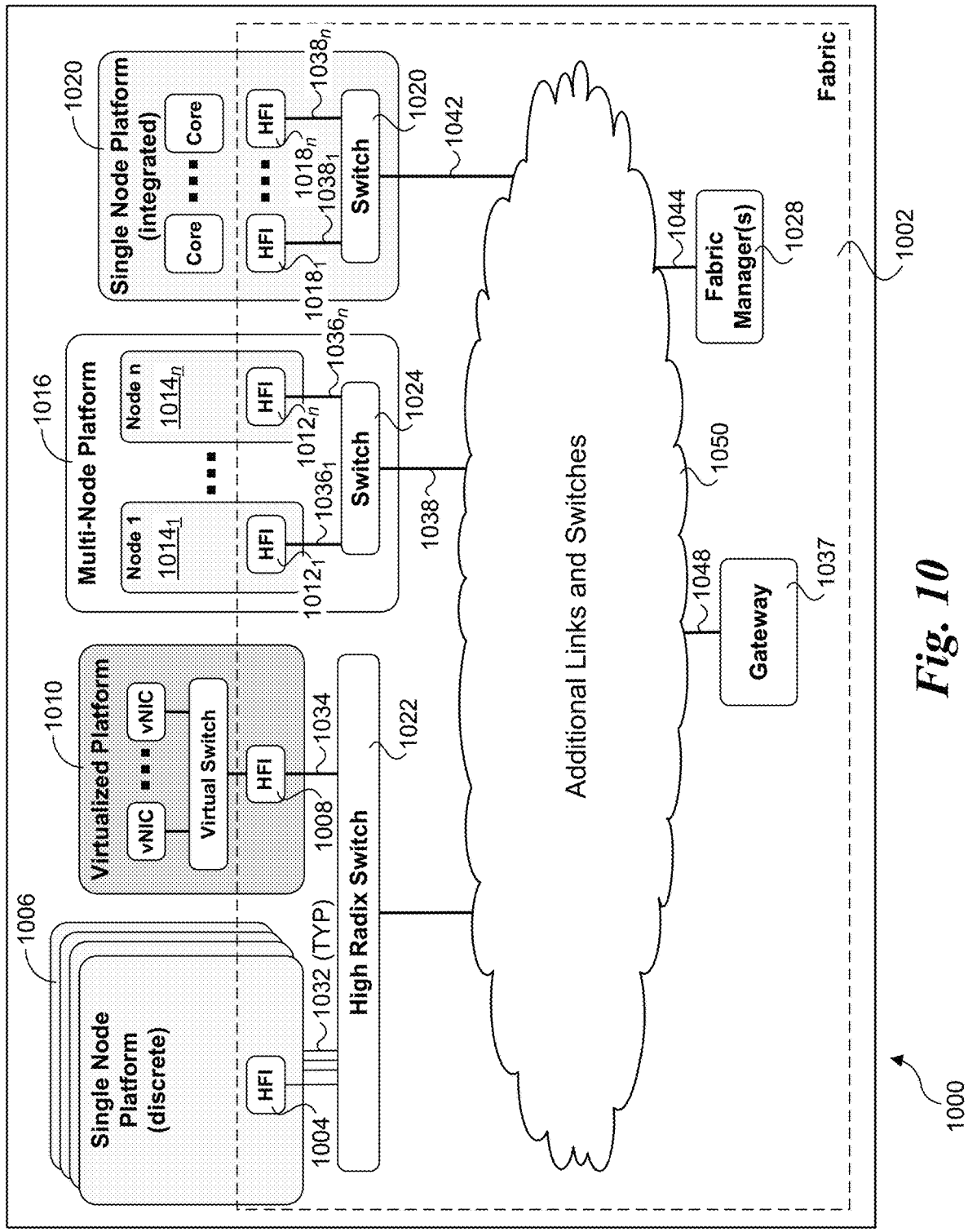
FIG. 10 is a schematic diagram illustrating a high-level view of a system comprising various components and interconnects of the fabric architecture, according to one embodiment.

FIG. 10 shows a high-level view of a system 1000 illustrating various components and interconnects of a system architecture in which various configurations of originator and target nodes may be implemented, according to one embodiment. A central feature of the architecture is the fabric 1002, which includes a collection of the HFIs and gateways interconnected via the architectures links and switches. As depicted in FIG. 10, the fabric 1002 components includes multiple HFIs 1004 (one is shown), each hosted by a respective discrete single node platform 1006, an HFI 1008 hosted by a virtual platform 1010, HFIs $1012_1$ and $1012_n$ hosted by respective nodes $1014_1$ and $1014_n$ of a multi-node platform 1016, and HFIs $1018_1$ and $1018_n$ of an integrated single node platform 1020, a high radix switch 1022, switches 1024 and 1026, fabric manager(s) 1028, a gateway 1030, links 1032, 1034, $1036_1$, $1036_n$, 1038, $1040_1$, $1040_n$, 1042, 1044, 1048, and additional links and switches collectively shown as a cloud 1050.

In system 1000, the various nodes may be used to host MPI processes and/or otherwise may be implemented to host processes for which communication is facilitated through use of the Portals network programming interface and associated API and libraries. In one embodiment, the processes executing on the nodes are MPI processes, which communication facilitated via use of a Portals-based implementation of the MPI libraries.

Generalized HPC Environments

Figure 11:
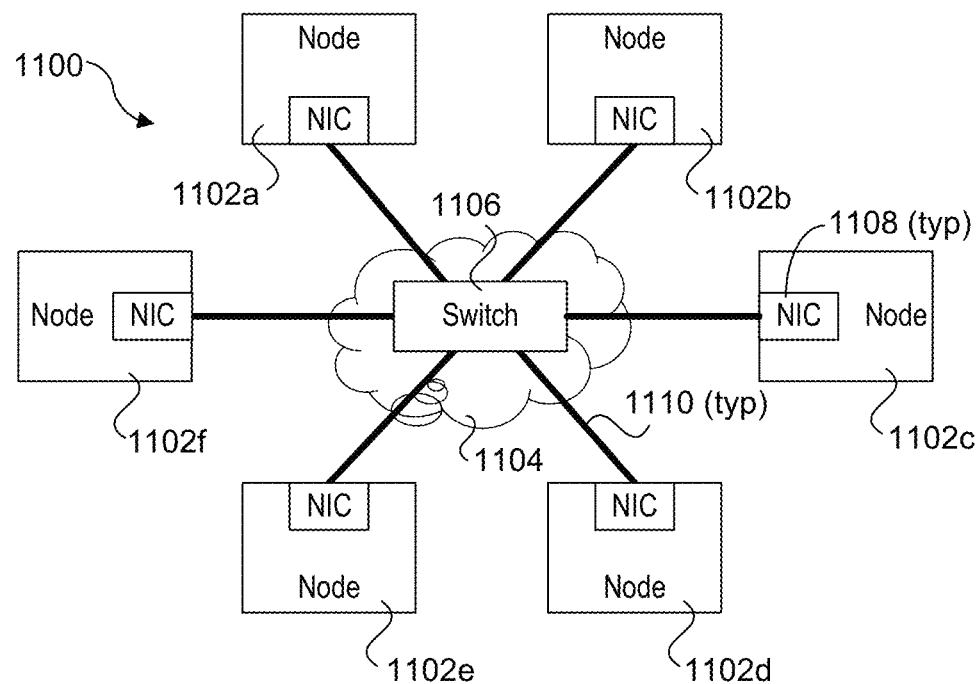
FIG. 11 is a schematic diagram of an exemplary HPC cluster communicatively coupled via a network or fabric.
Figure 12:
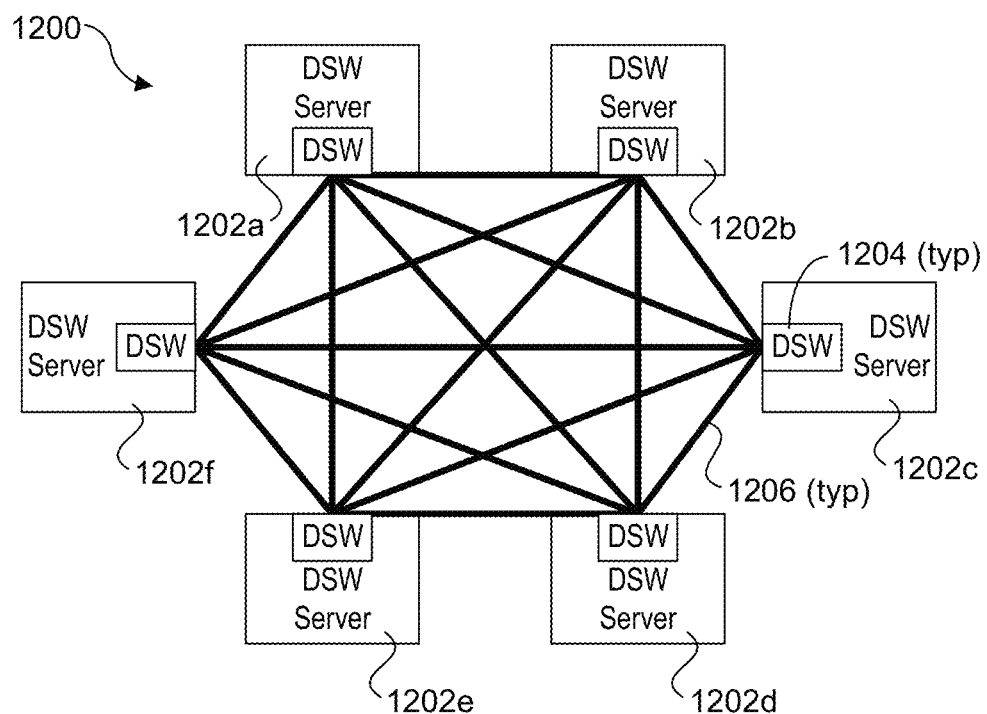
FIG. 12 is a schematic diagram of an exemplary HPC cluster of disaggregated switch (DSW) servers coupled via direct peer-to-peer links.

FIGS. 11 and 12 show examples of small HPC clusters 1100 and 1200 illustrative of more generalized HPC environments in which the embodiments of the improved rendezvous protocol may be implemented. HPC cluster 1100 is illustrative of a conventional network environment under which multiple nodes 1102a, 1102b, 1102c, 1102d, 1102e, and 1102f are coupled in communication over a network or fabric 1104 including a switch 1106. As further shown, each node 1102 includes a NIC 1108 that is coupled to switch 1106 via a link 1110. Generally, network 1104 may employ various types of physical links and related protocols, including but not limited to Ethernet and InfiniBand. In the latter case, NICs 1108 would be replaced with InfiniBand Host Control Adaptors (HCAs).

HPC cluster 1200 comprises a cluster of disaggregated switch (DSW) servers 1202a, 1202b, 1202c, 1202d, 1202e, and 1202f that include DSW interfaces 1204 that support direct peer-to-peer links 1206 without the need for a switch. In one embodiment, a cluster or array of DSW servers may be installed in a tray or drawer in a DSW rack, such as available under the INTEL® Rack Scale Design architecture.

Figure 13:
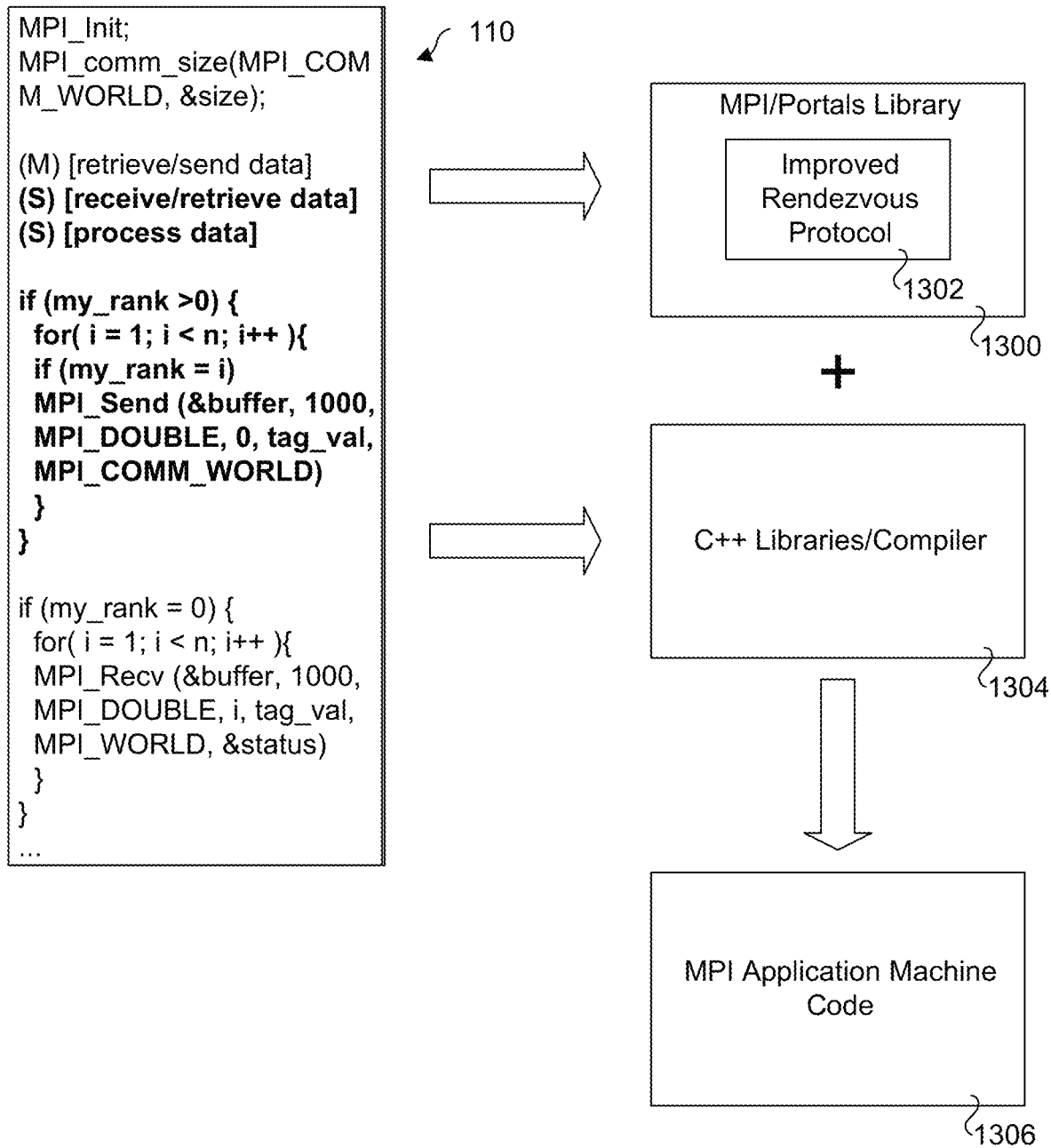
FIG. 13 is a block diagram illustrating use of an MPI/Portals library 1300 including an improved rendezvous protocol function 1302 to generate MPI application machine code via compilation of an MPI application.

FIG. 13 shows use of an MPI/Portals library 1300 including an improved rendezvous protocol function 1302. As illustrated, MPI application machine code 1306 is generated by compiling WI application 110 using MPI/Portals library 1300 and C++ libraries/compiler 1304. Generally, depending on the operating system and other software/hardware platform considerations, various well-known C++ libraries and compilers may be used for C++ libraries/compiler 1304.

In addition to implementation is software, aspects of the embodiments disclosed herein may be implemented in hardware. For example, MPI operations may be split between software running on a host and hardware in a fabric or network adapter, InfiniBand HCA, HFI, etc. Under this scheme, the host would still execution software instructions that are compiled for source code for a corresponding MPI application or process, such as WI Send and MPI_Recv, while the actual RMA transfer of data corresponding to these functions is implemented in hardware using an embedded processor or engine and/or embedded logic or programmed logic implemented using an Field Programmable Gate Array (FPGA).

Figure 14:
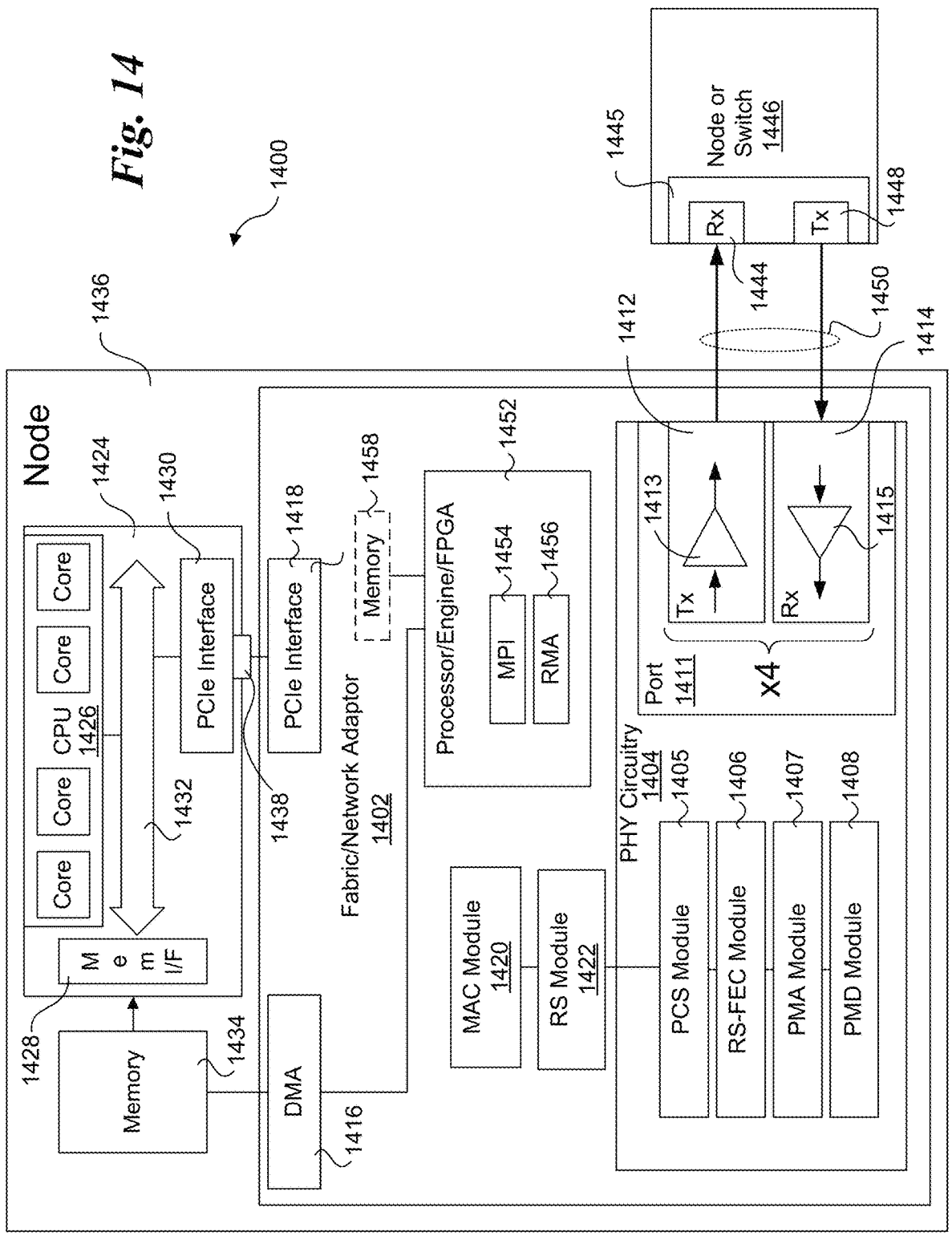
FIG. 14 is a schematic diagram illustrating an architecture for a node employing a fabric or network adaptor configured to implement a portion of the MPI and RMA operations for the improved rendezvous protocol described herein.

FIG. 14 shows an architecture 1400 for a network node employing a fabric or network adaptor 1102 configured to implement MPI data transfers in accordance with aspects of the embodiments disclosed herein. Fabric/Network adaptor 1402 comprises PHY (Physical Layer) circuitry 1404 including a Physical Coding Sublayer (PCS) module 1405, a Reed-Solomon Forward Error Correction (RS-FEC) module 1406, a Physical Medium Attachment (PMA) module 1407, PMD module 1408, a fabric or network port 1411 including a transmitter (Tx) port 1412 having transmitter circuitry 1413 and a receiver (Rx) port 1414 having receiver circuitry 1415. Fabric/Network adaptor 1102 further includes a DMA (Direct Memory Access) interface 1416, a Peripheral Component Interconnect Express (PCIe) interface 1418, a MAC (Media Access Channel) module 1420 and a Reconciliation Sublayer (RS) module 1422.

Node 1400 also comprises a System on a Chip (SoC) 1424 including a Central Processing Unit (CPU) 1426 having one or more processor cores, coupled to a memory interface 1148 and a PCIe interface 1430 via an interconnect 1432. Memory interface 1428 is further depicted as being coupled to memory 1434. Under a typical configuration, Fabric/Network adaptor 1102, SoC 1124 and memory 1134 will be mounted on or otherwise operatively coupled to a circuit board 1436 that includes wiring traces for coupling these components in communication, as depicted by single lines connecting DMA 1416 to memory 1434 and PCIe interface 1418 to PCIe interface 1430 at a PCIe port 1438. Those having skill in the art will understand that these interconnects are simplified for illustrative purposes, but would involve multiple physical connectors, and would be configured to operate using appropriate protocols.

In one embodiment, MAC module 1120 is configured to implement aspects of the MAC layer operations performed that are well-known in the art. Similar, RS module 1122 is configured to implement reconciliation sub-layer operations.

As further illustrated, transmit port 1412 is connected to a receive port 1444 of a fabric or network port 1445 of a node or switch 1446, while a transmit port 1448 is connected to receive port 1414, thus supporting a bi-directional link 1450. Generally, for implementations employing point-to-point links between nodes, node or switch 1446 is a node, while for implementations including fabrics or networks with switches, node or switch 1446 is a switch.

In one embodiment, PHY circuitry 1404 is configured to support a high-speed Ethernet link, such as a 100 Gigabit per second (Gb/s) Ethernet link. Under various embodiments, the physical structure of bi-directional link 1450 includes one or more wires in each direction. For example, one embodiment of a 100 Gb Ethernet link employs four "lanes" in each direction, wherein signals sent over each lane is sent over a separate physical wire. In addition the Ethernet links, other types of links may be supported, including both wired links and optical links. Various communication protocols may also be implemented over the PHY links, including both protocols employing multi-lane links as well as single-lane links.

Fabric/network adaptor 1402 further includes a processor/engine/FPGA 1452 configured to support MPI operations 1454 and RMA operations 1456. When processor/engine/FPGA 1452 is implemented as a processor (also referred to as an embedded processor), the processor may execute pre-complied instructions that are stored on fabric/network adaptor 1402, such as firmware instructions 1402. When processor/engine/FPGA 1452 is implemented as an engine or FPGA, the MPI and RMA operations are implemented using embedded logic comprising either predetermined logic, programmable logic, or a combination thereof. It is also possible to combine a processor with such embedded logic.

In one embodiment, aspects of the improved rendezvous protocol described and illustrated herein are implemented via processor/engine/FPGA 1452. For example, a portion of the Portals operations illustrated in FIGS. 8 and 9, including the RMA data transfers are off-loaded from software executing on the host (e.g., executing on CPU 1426) to processor/engine/FPGA 1452. Depending on the implementation, various data structures and data buffers may be implemented via memory on-board processor/engine/FPGA 1452 (not shown), memory in an optional memory device 1458 coupled to processor/engine/FPGA 1452, and/or in memory 1434 that are accessed using DMA 1416. (It is noted that the lines connecting DMA 1416 are illustrated of a logical path, as the actual data path would include PCIe interfaces 1418 and 1438.) It is also common for an FPGA chip to include some on-board memory.

Further aspects of the subject matter described herein are set out in the following numbered clauses:

1. A method comprising:
    sending a PUT request message from a sender to a receiver, the PUT request message including first and second match indicia and including payload data that is stored in a send buffer on the sender;
    subsequent to initiating sending of the PUT request message, initiating exposing the send buffer;
    determining, at the receiver and via use of the first match indicia, whether the PUT request is expected or unexpected; and
    when the message is unexpected,
    dropping the payload data included in the PUT request message;
    initiating a remote memory access (RMA) GET from the receiver, the RMA GET including a GET request message sent from the receiver to the sender including the second match indicia; and
    returning the payload data in the send buffer from the sender to the receiver using an RMA operation, wherein the send buffer is identified via use of the second match indicia.

2. The method of clause 1, wherein the sender and receiver are associated with respective processes running in respective user spaces in memory, wherein the RMA GET writes the data that is returned to a memory region in the user space of the process associated with the receiver.

3. The method of clause 1 or 2, wherein it is determined the PUT request message is expected, further comprising:
    creating, prior to receiving the PUT request message, a matching list entry at the receiver, the matching list entry including matching indicia and identifying an associated memory region in a receive buffer on the receiver;
    determining, by comparing the first matching indicia to the matching list entry that was created that there is a match, indicating the message was expected; and
    writing the payload data sent with the PUT request message to the memory region identified by the matching list entry.

4. The method of any of the preceding clauses, wherein the PUT request message is unexpected, further comprising:
    determining, at the sender in response to receiving the GET request message, that the send buffer has yet to be exposed and returning a first GET response message including data indicating the send buffer has yet to be exposed to the receiver;
    initiating a retry RMA GET from the receiver comprising a retry of the GET request message sent from the receiver to the sender;
    in response to receiving the retry of the GET request at the sender,
    determining whether the send buffer has been exposed and returning a copy of data in the send buffer to the receiver as payload data in a GET response message if the send buffer has been exposed,
    otherwise, returning a GET response message including data indicating the send buffer has yet to be exposed to the receiver and repeating operations ii.-iv. until the send buffer has been exposed and a copy of data in the send buffer is returned to the receiver.

5. The method of any of the preceding clauses, wherein the method is facilitated via use of the Portals network programming interface on the sender and the receiver.

6. The method of clause 5, wherein the first match indicia comprises match bits in a Portals PUT request message, and the second match indicia comprises a tag in a header of the Portals PUT request message.

7. The method of clause 5, wherein exposing the send buffer comprises adding a matching list entry to a priority list at the sender, and wherein the send buffer is identified by matching the second match indicia with the matching list entry.

8. The method of clause 7, wherein the Portals Put request message includes match bits comprising the second match indicia, the method further comprising:
    in response to receiving the first Portals PUT request message, extracting the match bits and comparing the match bits to one or more matching list entries on the sender to identify a match, wherein no match is initially found;

creating a new header entry in an unexpected list including the first match indicia,
executing a RECV function on the receiver having third match indicia;
matching the third match indicia with the first match indicia in the new header entry;
issuing an Portals GET request message from the receiver to the sender including match bits comprising the second match indicia;
in response to receiving the Portals GET request message, extracting the match bits and comparing the match bits to one or more matching list entries on the sender to identify a match, wherein a match is found with the matching list entry that was added at the sender;
identifying a memory location of the payload data in the send buffer based on information in the matching list entry that is matched; and
returning the payload data to the receiver via a GET response.

9. The method of clause 5, wherein the method is performed via execution of a first Message Passing Interface (MPI) process on a first MPI node corresponding to the sender and a second MPI process executing on a second MPI node corresponding to the receiver, and wherein the first and second MPI processes are implemented via use of Portals MPI library functions.

10. The method of any of clauses 1-8, wherein the method is performed via execution of a first Message Passing Interface (MPI) process on a first MPI node corresponding to the sender and a second MPI process executing on a second MPI node corresponding to the receiver.

11. A non-transient machine-readable media having instruction stored thereon, including instructions configured to be executed via first and second processes, the first process corresponding to a sender and the second process corresponding to a receiver, wherein execution of the instructions enable the first and second processes to:
send a PUT request message from a sender to a receiver, the PUT request message including first and second match indicia and including payload data that is stored in a send buffer on the sender;
subsequent to initiating sending of the PUT request message, initiate exposing the send buffer;
determine, at the receiver and via use of the first match indicia, whether the PUT request is expected or unexpected; and
when the message is unexpected,
drop the payload data included in the PUT request message;
initiate a remote memory access (RMA) GET from the receiver, the RMA GET including a GET request message sent from the receiver to the sender including the second match indicia; and
return the payload data in the send buffer from the sender to the receiver using an RMA operation, wherein the send buffer is identified via use of the second match indicia.

12. The non-transient machine-readable media of clause 11, wherein the first and second processes are running in respective user spaces in memory, and wherein the RMA GET writes the data that is returned to a memory region in the user space of the second process.

13. The non-transient machine-readable media of clause 11 or 12, wherein it is determined the PUT request message is expected, wherein execution of the instructions performs enables the first and second processes to:

create, on the receiver and prior to receiving the PUT request message, a matching list entry at the receiver, the matching list entry including matching indicia and identifying an associated memory region in a receive buffer on the receiver;
determine, by comparing the first matching indicia to the matching list entry that was created that there is a match, indicating the message was expected; and
write the payload data sent with the PUT request message to the memory region identified by the matching list entry.

14. The non-transient machine-readable media of any of clauses 11-13, wherein the PUT request message is unexpected and the RMA GET initiated from the receiver is a first RMA GET comprising a first GET request message, and wherein execution of the instructions performs enables the first and second processes to:
determine, using the second match indicia at the sender in response to receiving the first GET request message, that the send buffer has yet to be exposed and returning a first GET response message including data indicating the send buffer has yet to be exposed to the receiver;
initiate a retry RMA GET from the receiver comprising a second GET request message sent from the receiver to the sender including the second match indicia;
in response to receiving the second GET request at the sender,
determine, using the second match indicia, that the send buffer has been exposed and return a copy of data in the send buffer to the receiver as payload data in a second GET response message.

15. The non-transient machine-readable media of any of clauses 11-14, wherein each of the first and second processes employ the Portals network programming interface.

16. The non-transient machine-readable media of clause 15, wherein the first match indicia comprises match bits in a Portals PUT request message, and the second match indicia comprises a tag in a header of the Portals PUT request message.

17. The non-transient machine-readable media of clause 15, wherein the send buffer is exposed by adding a matching list entry to a matching list data structure at the sender, and wherein the send buffer is identified by matching the second match indicia with the matching list entry.

18. The non-transient machine-readable media of clause 17, wherein the Portals Put request message comprises a first Portals PUT request message including match bits comprising the second match indicia, wherein execution of the instructions performs enables the first and second processes to:
in response to receiving the first Portals PUT request message, extract the match bits and compare the match bits to one or more matching list entries on the sender to identify a match, wherein no match is initially found;
create a new header entry in an unexpected list including the first match indicia,
execute a RECV function on the receiver having third match indicia;
match the third match indicia with the first match indicia in the new header entry;
issue an Portals GET request message from the receiver to the sender including match bits comprising the second match indicia;
in response to receiving the Portals GET request message, extract the match bits and comparing the match bits to one or more matching list entries on the sender to identify a match, wherein a match is found with the matching list entry that was added at the sender;

identify a memory location of the payload data in the send buffer based on information in the matching list entry that is matched; and return the payload data to the receiver via a GET response.

19. The non-transient machine-readable media of clause 15, wherein the method is performed via execution of a first Message Passing Interface (MPI) process on a first MPI node corresponding to the sender and a second MPI process executing on a second MPI node corresponding to the receiver, and wherein the first and second MPI processes are implemented via use of Portals MPI library functions.

20. The non-transient machine-readable media of any of clauses 11-19, wherein the instructions include a Message Passing Interface (MPI) application that is executed via a first MPI process on a first MPI node corresponding to the sender and is executed via a second MPI process running on a second MPI node corresponding to the receiver.

21. A system comprising a plurality of nodes, each executing a respective process enabling each node to operate as a sender and receiver, wherein under a given data transfer from a first node to a second node the first node comprises a sender and the second node comprises a receiver, and the given data transfer comprises:

sending a PUT request message from a sender to a receiver, the PUT request message including first and second match indicia and including payload data that is stored in a send buffer on the sender;

after sending the PUT request message, initiating exposing the send buffer;

determining, at the receiver and via use of the first match indicia, whether the PUT request is expected or unexpected; and when the message is unexpected, dropping the payload data included in the PUT request message;

initiating a remote memory access (RMA) GET from the receiver, the RMA GET including a GET request message sent from the receiver to the sender including the second match indicia; and returning the payload data in the send buffer from the sender to the receiver using an RMA operation, wherein the send buffer is identified via use of the second match indicia.

22. The system of clause 21, wherein the first and second processes are running in respective user spaces in memory respectively associated with the first and second nodes, and wherein the RMA GET writes the data that is returned to a memory region in the user space of the second process.

23. The system of clause 21 or 22, wherein the given data transfer further comprises:

creating, on the receiver and prior to receiving the PUT request message, a matching list entry at the receiver, the matching list entry including matching indicia and identifying an associated memory region in a receive buffer on the receiver;

determining, by comparing the first matching indicia to the matching list entry that was created that there is a match, indicating the message was expected; and writing the payload data sent with the PUT request message to the memory region identified by the matching list entry.

24. The system of any of clauses 21-23, wherein the PUT request message is unexpected, and the given data transfer further comprises:

determining, at the sender in response to receiving the GET request message, that the send buffer has yet to be exposed and returning a first GET response message including data indicating the send buffer has yet to be exposed to the receiver;

initiating a retry RMA GET from the receiver comprising a retry of the GET request message sent from the receiver to the sender;

in response to receiving the retry of the GET request at the sender, determining whether the send buffer has been exposed and returning a copy of data in the send buffer to the receiver as payload data in a GET response message if the send buffer has been exposed, otherwise, returning a GET response message including data indicating the send buffer has yet to be exposed to the receiver and repeating operations ii.-iv. until the send buffer has been exposed and a copy of data in the send buffer is returned to the receiver.

25. The system of any of clauses 21-24, wherein each of the first and second processes employ the Portals network programming interface.

26. The system of any of clauses 21-25, wherein the first match indicia comprises match bits in a Portals PUT request message, and the second match indicia comprises a tag in a header of the Portals PUT request message.

27. The system of clause 25 or 26, wherein exposing the send buffer comprises adding a matching list entry to a priority list at the sender, and wherein the send buffer is identified by matching the second match indicia with the matching list entry.

28. The system of clause 27, wherein the Portals Put request message includes match bits comprising the second match indicia, the method further comprising:

in response to receiving the first Portals PUT request message, extracting the match bits and comparing the match bits to one or more matching list entries on the sender to identify a match, wherein no match is initially found;

creating a new header entry in an unexpected list including the first match indicia, executing a RECV function on the receiver having third match indicia;

matching the third match indicia with the first match indicia in the new header entry;

issuing an Portals GET request message from the receiver to the sender including match bits comprising the second match indicia;

in response to receiving the Portals GET request message, extracting the match bits and comparing the match bits to one or more matching list entries on the sender to identify a match, wherein a match is found with the matching list entry that was added at the sender;

identifying a memory location of the payload data in the send buffer based on information in the matching list entry that is matched; and returning the payload data to the receiver via a GET response.

29. The system of any of clauses 25-28, wherein the first node and second nodes respective comprise first and second Message Passing Interface (MPI) nodes executing respective first and second MPI processes corresponding to the sender and the receiver, and wherein the first and second MPI processes are implemented via use of Portals MPI library functions.

30. The system of any of clauses 21-28, wherein the first node and second nodes respective comprise first and second Message Passing Interface (MPI) nodes executing respective first and second MPI processes corresponding to the sender and the receiver.

31. An apparatus, to be installed in or coupled to a host comprising a node in a system comprising a plurality of nodes that are linked in communication via a fabric or network, comprising:
   a fabric or network port, to be coupled to the fabric or the network;
   an input/output (IO) interface, to facilitate communication between the host and apparatus; and
   wherein the apparatus is configured to operate as a sender when installed in or coupled to the host for a data transfer from a first node comprising the host to a second node in the system operating as a receiver for the data transfer, wherein the apparatus is further configured to,
   send a PUT request message to the receiver, the PUT request message including first and second match indicia and including payload data that is stored in a send buffer on one of the host and the apparatus;
   subsequent to initiating sending of the PUT request message, initiate exposing the send buffer;
   receive a remote memory access (RMA) GET from the receiver, the RMA GET comprising a GET request message including the second match indicia; and
   determine if the send buffer has been exposed via use of the second match indicia; and
   return the payload data in the send buffer to the receiver using an RMA operation if it is determined the send buffer has been exposed.

32. The apparatus of clause 31, wherein the apparatus is further configured to:
   determine, in response to receiving the GET request message, that the send buffer has yet to be exposed and return a first GET response message including data indicating the send buffer has yet to be exposed to the receiver;
   receive a retry RMA GET from the receiver comprising a retry of the GET request message sent from the receiver;
   in response to receiving the retry of the GET request, determine whether the send buffer has been exposed and return a copy of data in the send buffer to the receiver as payload data in a GET response message if the send buffer has been exposed,
   otherwise, return a GET response message including data indicating the send buffer has yet to be exposed to the receiver.

33. The apparatus of clause 31 or 32, wherein the data transfer is facilitated via use of the Portals network programming interface on the sender and the receiver.

34. The apparatus of clause 33 wherein the first match indicia comprises match bits in a Portals PUT request message, and the second match indicia comprises a tag in a header of the Portals PUT request message.

35. The apparatus of clause 34, wherein exposing the send buffer comprises adding a matching list entry to a priority list at the sender, and wherein the send buffer is identified by matching the second match indicia with the matching list entry.

36. The apparatus of clause 35, wherein the apparatus is further configured to:
   expose the send buffer by adding a matching list entry to a matching list on the sender, the matching list entry comprising one of a plurality of entries in the matching list;
   receive a Portals GET request message from the receiver including match bits comprising the second match indicia;
   in response to receiving the Portals GET request message, extract the match bits and compare the match bits to one or more matching list entries to identify a match, wherein a match is found with the matching list entry that was added;
   identify a memory location of the payload data in the send buffer based on information in the matching list entry that is matched; and
   return the payload data to the receiver via a GET response.

37. The apparatus of any of clauses 33-36, wherein the first node and second nodes respectively comprise first and second Message Passing Interface (MPI) nodes executing respective first and second MPI processes corresponding to the sender and the receiver, and wherein the first and second MPI processes are implemented via use of Portals MPI library functions.

38. The apparatus of any of clauses 31-36, wherein the first node and second nodes respective comprise first and second Message Passing Interface (MPI) nodes executing respective first and second MPI processes corresponding to the sender and the receiver.

39. The apparatus of any of clauses 31-38, wherein the apparatus includes an embedded processor and instructions stored on the apparatus that when executed on the embedded processor enable the apparatus to operate as the sender.

40. The apparatus of any of clauses 31-38, wherein the apparatus includes embedded logic to enable the apparatus to operate as the sender.

41. The apparatus of clause 40, wherein the embedded logic includes a field programmable gate array (FPGA) that is programmed to enable the apparatus to operate as the sender.

42. The apparatus of any of clauses 31-41, wherein the apparatus is a host fabric interface.

43. An apparatus, to be installed in or coupled to a host comprising a first node in a system comprising a plurality of nodes that are linked in communication via a fabric or network, comprising:
   a fabric or network port, to be coupled to the fabric or the network;
   an input/output (IO) interface, to facilitate communication between the host and apparatus,
   wherein the apparatus is configured, when installed in or coupled to the host, to operate as a receiver for a data transfer from a second node comprising a sender, wherein the apparatus is further configured to,
   receive a PUT request message from the sender, the PUT request message including first and second match indicia and including payload data that is stored in a send buffer on the sender;
   determine, via use of the first match indicia, whether the PUT request is expected or unexpected; and
   when the message is unexpected,
   drop the payload data included in the PUT request message;
   initiate a remote memory access (RMA) GET operation including a GET request message sent to the sender including the second match indicia; and
   receive the payload data in a GET response message from the sender using an RMA operation.

44. The apparatus of clause 43, wherein the host comprises a central processing unit (CPU) coupled to memory and is running a receive process in a user space in the memory, and wherein the RMA operation used to receive the payload data writes the data that is received to a memory region in the user space.

45. The apparatus of clause 43 or 44, wherein it is determined the PUT request message is expected, wherein the apparatus is further configured to:
create, prior to receiving the PUT request message, a matching list entry including matching indicia and identifying an associated memory region in a receive buffer on the first node;
determine, by comparing the first matching indicia to the matching list entry that was created that there is a match, indicating the message was expected; and
write the payload data sent with the PUT request message to the memory region identified by the matching list entry.

46. The apparatus of clause 43, wherein the PUT request message is unexpected and the RMA GET operation initiated from the apparatus is a first RMA GET comprising a first GET request message, and wherein the apparatus is further configured to:
receive a first GET response message including data indicating the send buffer at the sender has yet to be exposed;
initiate a retry RMA GET comprising a second GET request message sent to the sender including the second match indicia; and
receiving a copy of data in the send buffer from the sender as payload data in a second GET response message.

47. The apparatus of any of clauses 43-46, wherein the first and second nodes respectively implement first and second processes employing the Portals network programming interface.

48. The apparatus of clause 47, wherein the first match indicia comprises match bits in a Portals PUT request message, and the second match indicia comprises a tag in a header of the Portals PUT request message.

49. The apparatus of clause 47 or 48, wherein the Portals PUT request message comprises a first Portals PUT request message including match bits comprising the second match indicia, and wherein the apparatus is further configured to:
in response to receiving the first Portals PUT request message, extract the match bits and compare the match bits to one or more matching list entries to identify a match, wherein no match is initially found;
create a new header entry in an unexpected list including the first match indicia,
execute a RECV function having third match indicia;
match the third match indicia with the first match indicia in the new header entry;
send a Portals GET request message to the sender including match bits comprising the second match indicia; and
receive the payload data from the sender via a GET response message.

50. The apparatus of any of clauses 43-49, wherein the first node and second nodes respectively comprise first and second Message Passing Interface (MPI) nodes executing respective first and second MPI processes corresponding to the sender and the receiver, and wherein the first and second MPI processes are implemented via use of Portals MPI library functions.

51. The apparatus of any of clauses 43-49, wherein the first node and second nodes respective comprise first and second Message Passing Interface (MPI) nodes executing respective first and second MPI processes corresponding to the sender and the receiver.

52. The apparatus of any of clauses 43-51, wherein the apparatus includes an embedded processor and instructions stored on the apparatus that when executed on the embedded processor enable the apparatus to operate as the receiver.

53. The apparatus of any of clauses 43-51, wherein the apparatus includes embedded logic to enable the apparatus to operate as the receiver.

54. The apparatus of clause 53, wherein the embedded logic includes a field programmable gate array (FPGA) that is programmed to enable the apparatus to operate as the receiver.

55. The apparatus of any of clauses 31-41, wherein the apparatus is a host fabric interface.

56. An apparatus, to be installed in or coupled to a host comprising a node in a system comprising a plurality of nodes that are linked in communication via a fabric or network, comprising:
a fabric or network port, to be coupled to the fabric or the network;
means for facilitating communication between the host and apparatus; and
wherein the apparatus is configured to operate as a sender when installed in or coupled to the host for a data transfer from a first node comprising the host to a second node in the system operating as a receiver for the data transfer, wherein the apparatus further includes means for,
sending a PUT request message to the receiver, the PUT request message including first and second match indicia and including payload data that is stored in a send buffer on one of the host and the apparatus;
subsequent to initiating sending of the PUT request message, initiating exposing the send buffer;
receiving a remote memory access (RMA) GET from the receiver, the RMA GET comprising a GET request message including the second match indicia; and
determining if the send buffer has been exposed via use of the second match indicia; and
return the payload data in the send buffer to the receiver using an RMA operation if it is determined the send buffer has been exposed.

57. The apparatus of clause 56, further comprising means for:
determining, in response to receiving the GET request message, that the send buffer has yet to be exposed and return a first GET response message including data indicating the send buffer has yet to be exposed to the receiver;
receiving a retry RMA GET from the receiver comprising a retry of the GET request message sent from the receiver;
in response to receiving the retry of the GET request, determining whether the send buffer has been exposed and return a copy of data in the send buffer to the receiver as payload data in a GET response message if the send buffer has been exposed,
otherwise, returning a GET response message including data indicating the send buffer has yet to be exposed to the receiver.

58. The apparatus of clause 56 or 57, wherein the data transfer is facilitated via use of the Portals network programming interface on the sender and the receiver.

59. The apparatus of clause 57 wherein the first match indicia comprises match bits in a Portals PUT request message, and the second match indicia comprises a tag in a header of the Portals PUT request message.

60. The apparatus of clause 58, wherein exposing the send buffer comprises adding a matching list entry to a priority list at the sender, and wherein the send buffer is identified by matching the second match indicia with the matching list entry.

61. The apparatus of clause 59, further comprising means for:
exposing the send buffer by adding a matching list entry to a matching list on the sender, the matching list entry comprising one of a plurality of entries in the matching list;
receiving a Portals GET request message from the receiver including match bits comprising the second match indicia;
in response to receiving the Portals GET request message, extract the match bits and compare the match bits to one or more matching list entries to identify a match, wherein a match is found with the matching list entry that was added;
identifying a memory location of the payload data in the send buffer based on information in the matching list entry that is matched; and
returning the payload data to the receiver via a GET response.

62. The apparatus of any of clauses 58-61, wherein the first node and second nodes respectively comprise first and second Message Passing Interface (MPI) nodes executing respective first and second MPI processes corresponding to the sender and the receiver, and wherein the first and second MPI processes are implemented via use of Portals MPI library functions.

63. The apparatus of any of clauses 56-61, wherein the first node and second nodes respective comprise first and second Message Passing Interface (MPI) nodes executing respective first and second MPI processes corresponding to the sender and the receiver.

64. The apparatus of any of clauses 56-63, wherein the apparatus includes an embedded processor and instructions stored on the apparatus that when executed on the embedded processor enable the apparatus to operate as the sender.

65. The apparatus of any of clauses 56-63, wherein the apparatus includes embedded logic to enable the apparatus to operate as the sender.

66. The apparatus of clause 65, wherein the embedded logic includes a field programmable gate array (FPGA) that is programmed to enable the apparatus to operate as the sender.

67. The apparatus of any of clauses 56-66, wherein the apparatus is a host fabric interface.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
    sending a first PUT request message from a sender to a receiver, the first PUT request message including first and second match indicia and including payload data that is stored in a send buffer on the sender;
    subsequent to initiating sending of the first PUT request message, initiating exposing the send buffer;
    determining, at the receiver and via use of the first match indicia, the first PUT request message is unexpected; and in response thereto,
        dropping the payload data included in the first PUT request message;
        initiating a remote memory access (RMA) GET from the receiver, the RMA GET including a GET request message sent from the receiver to the sender including the second match indicia; and
        returning the payload data in the send buffer from the sender to the receiver using an RMA operation, wherein the send buffer is identified via use of the second match indicia.

2. The method of claim 1, wherein the sender and receiver are associated with respective processes running in respective user spaces in memory, wherein the RMA GET writes the data that is returned to a memory region in the user space of the process associated with the receiver.

3. The method of claim 1, further comprising:
    sending a second PUT request message from a sender to a receiver, the second PUT request message including third and fourth match indicia and including payload data that is stored in a send buffer on the sender;
    subsequent to initiating sending of the second PUT request message, initiating exposing the send buffer;
    determining, at the receiver and via use of the third match indicia, the second PUT request message is expected; and in response thereto,
        creating, prior to receiving the second PUT request message, a matching list entry at the receiver, the matching list entry including matching indicia and identifying an associated memory region in a receive buffer on the receiver;
        determining, by comparing the first matching indicia to the matching list entry that was created that there is a match, indicating the message was expected; and
        writing the payload data sent with the second PUT request message to the memory region identified by the matching list entry.

4. The method of claim 1, further comprising:
    i. determining, at the sender in response to receiving the GET request message, that the send buffer has yet to be exposed and returning a first GET response message including data indicating the send buffer has yet to be exposed to the receiver;
    ii. initiating a retry RMA GET from the receiver comprising a retry of the GET request message sent from the receiver to the sender;
    iii. in response to receiving the retry of the GET request at the sender,
    iv. determining whether the send buffer has been exposed and returning a copy of data in the send buffer to the receiver as payload data in a GET response message if the send buffer has been exposed,
    otherwise, returning a GET response message including data indicating the send buffer has yet to be exposed to the receiver and repeating operations ii.-iv. until the send buffer has been exposed and a copy of data in the send buffer is returned to the receiver.

5. The method of claim 1, wherein the method is facilitated via use of a Portals network programming interface on the sender and the receiver.

6. The method of claim 5, wherein the first match indicia comprises match bits in a Portals PUT request message, and the second match indicia comprises a tag in a header of the Portals PUT request message.

7. The method of claim 5, wherein exposing the send buffer comprises adding a matching list entry to a priority list at the sender, and wherein the send buffer is identified by matching the second match indicia with the matching list entry.

8. The method of claim 7, wherein a Portals PUT request message includes match bits comprising the second match indicia, the method further comprising:
    in response to receiving a first Portals PUT request message, extracting the match bits and comparing the match bits to one or more matching list entries on the sender to identify a match, wherein no match is initially found;
    creating a new header entry in an unexpected list including the first match indicia,
    executing a RECV function on the receiver having third match indicia;
    matching the third match indicia with the first match indicia in the new header entry;
    issuing an Portals GET request message from the receiver to the sender including match bits comprising the second match indicia;

in response to receiving the Portals GET request message, extracting the match bits and comparing the match bits to one or more matching list entries on the sender to identify a match, wherein a match is found with the matching list entry that was added at the sender;

identifying a memory location of the payload data in the send buffer based on information in the matching list entry that is matched; and returning the payload data to the receiver via a GET response.

9. The method of claim 1, wherein the method is performed via execution of a first Message Passing Interface (MPI) process on a first MPI node corresponding to the sender and a second MPI process executing on a second MPI node corresponding to the receiver, and wherein the first and second MPI processes are implemented via use of Portals MPI library functions.

10. The method of claim 1, wherein the method is performed via execution of a first Message Passing Interface (MPI) process on a first MPI node corresponding to the sender and a second MPI process executing on a second MPI node corresponding to the receiver.

11. A non-transitory machine-readable storage media having instruction stored thereon, including instructions configured to be executed via first and second processes, the first process corresponding to a sender and the second process corresponding to a receiver, wherein execution of the instructions enable the first and second processes to:

send a first PUT request message from a sender to a receiver, the first PUT request message including first and second match indicia and including payload data that is stored in a send buffer on the sender;

subsequent to initiating sending of the first PUT request message, initiate exposing the send buffer;

determine, at the receiver and via use of the first match indicia, the first PUT request message is unexpected; and in response thereto, drop the payload data included in the PUT request message;

initiate a remote memory access (RMA) GET from the receiver, the RMA GET including a GET request message sent from the receiver to the sender including the second match indicia; and return the payload data in the send buffer from the sender to the receiver using an RMA operation, wherein the send buffer is identified via use of the second match indicia.

12. The non-transitory machine-readable storage media of claim 11, wherein the first and second processes are running in respective user spaces in memory, and wherein the RMA GET writes the data that is returned to a memory region in the user space of the second process.

13. The non-transitory machine-readable storage media of claim 11, wherein execution of the instructions performs enables the first and second processes to:

send a second PUT request message from a sender to a receiver, the second PUT request message including third and fourth match indicia and including payload data that is stored in a send buffer on the sender;

subsequent to initiating sending of the second PUT request message, initiate exposing the send buffer;

determine, at the receiver and via use of the third match indicia, the second PUT request message is expected; and in response thereto, create, on the receiver and prior to receiving the PUT request message, a matching list entry at the receiver, the matching list entry including matching indicia and identifying an associated memory region in a receive buffer on the receiver;

determine, by comparing the first matching indicia to the matching list entry that was created that there is a match, indicating the message was expected; and write the payload data sent with the PUT request message to the memory region identified by the matching list entry.

14. The non-transitory machine-readable storage media of claim 11, wherein the RMA GET initiated from the receiver is a first RMA GET comprising a first GET request message, and wherein execution of the instructions performs enables the first and second processes to:

determine, using the second match indicia at the sender in response to receiving the first GET request message, that the send buffer has yet to be exposed and returning a first GET response message including data indicating the send buffer has yet to be exposed to the receiver;

initiate a retry RMA GET from the receiver comprising a second GET request message sent from the receiver to the sender including the second match indicia;

in response to receiving the second GET request at the sender, determine, using the second match indicia, that the send buffer has been exposed and return a copy of data in the send buffer to the receiver as payload data in a second GET response message.

15. The non-transitory machine-readable storage media of claim 11, wherein each of the first and second processes employ a Portals network programming interface.

16. The non-transient machine-readable media of claim 15, wherein the first match indicia comprises match bits in a Portals PUT request message, and the second match indicia comprises a tag in a header of the Portals PUT request message.

17. The non-transitory machine-readable storage media of claim 15, wherein the send buffer is exposed by adding a matching list entry to a matching list data structure at the sender, and wherein the send buffer is identified by matching the second match indicia with the matching list entry.

18. The non-transitory machine-readable storage media of claim 17, wherein a first Portals PUT request message includes match bits comprising the second match indicia, and wherein execution of the instructions performs enables the first and second processes to:

in response to receiving the first Portals PUT request message, extract the match bits and compare the match bits to one or more matching list entries on the sender to identify a match, wherein no match is initially found;

create a new header entry in an unexpected list including the first match indicia, execute a RECV function on the receiver having third match indicia;

match the third match indicia with the first match indicia in the new header entry;

issue an Portals GET request message from the receiver to the sender including match bits comprising the second match indicia;

in response to receiving the Portals GET request message, extract the match bits and comparing the match bits to one or more matching list entries on the sender to identify a match, wherein a match is found with the matching list entry that was added at the sender;

identify a memory location of the payload data in the send buffer based on information in the matching list entry that is matched; and return the payload data to the receiver via a GET response.

19. The non-transitory machine-readable storage media of claim 15, wherein the method is performed via execution of a first Message Passing Interface (MPI) process on a first MPI node corresponding to the sender and a second MPI process executing on a second MPI node corresponding to the receiver, and wherein the first and second MPI processes are implemented via use of Portals MPI library functions.

20. The non-transitory machine-readable storage media of claim 11, wherein the instructions include an Message Passing Interface (MPI) application that is executed via a first MPI process on a first MPI node corresponding to the sender and is executed via a second MPI process running on a second MPI node corresponding to the receiver.

21. A system comprising a plurality of nodes, each executing a respective process on a processor enabling each node to operate as a sender and receiver, wherein under a given data transfer from a first node to a second node the first node comprises a sender and the second node comprises a receiver, and the given data transfer comprises:
sending a PUT request message from a sender to a receiver, the PUT request message including first and second match indicia and including payload data that is stored in a send buffer on the sender;
after sending the PUT request message, initiating exposing the send buffer;
determining, at the receiver and via use of the first match indicia, whether the PUT request message is unexpected; and in response thereto,
dropping the payload data included in the PUT request message;
initiating a remote memory access (RMA) GET from the receiver, the RMA GET including a GET request message sent from the receiver to the sender including the second match indicia; and
returning the payload data in the send buffer from the sender to the receiver using an RMA operation, wherein the send buffer is identified via use of the second match indicia.

22. The system of claim 21, wherein the first and second processes are running in respective user spaces in memory respectively associated with the first and second nodes, and wherein the RMA GET writes the data that is returned to a memory region in the user space of the second process.

23. The system of claim 21, wherein the given data transfer further comprises:
creating, on the receiver and prior to receiving the PUT request message, a matching list entry at the receiver, the matching list entry including matching indicia and identifying an associated memory region in a receive buffer on the receiver;
determining, by comparing the first matching indicia to the matching list entry that was created that there is a match, indicating the message was expected; and
writing the payload data sent with the PUT request message to the memory region identified by the matching list entry.

24. The system of claim 21, wherein each of the first and second processes employ a Portals network programming interface.

25. The system of claim 24, wherein the first node and second nodes respective comprise first and second Message Passing Interface (MPI) nodes executing respective first and second MPI processes corresponding to the sender and the receiver, and wherein the first and second MPI processes are implemented via use of Portals MPI library functions.

* * * * *